United States Patent
Ranjan et al.

(10) Patent No.: US 10,853,658 B2
(45) Date of Patent: Dec. 1, 2020

(54) IMAGE-BASED DETECTION OF OFFSIDE IN GAMEPLAY

(71) Applicant: SONY CORPORATION, Tokyo (JP)

(72) Inventors: Saket Ranjan, Bangalore (IN); Shreay Kumar, Bangalore (IN)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 16/174,410

(22) Filed: Oct. 30, 2018

(65) Prior Publication Data
US 2020/0134319 A1     Apr. 30, 2020

(51) Int. Cl.
*G06K 9/00* (2006.01)
*G06T 7/73* (2017.01)
(Continued)

(52) U.S. Cl.
CPC .......... *G06K 9/00724* (2013.01); *A63B 71/06* (2013.01); *G06T 7/248* (2017.01); *G06T 7/74* (2017.01); *G06T 2207/10016* (2013.01); *G06T 2207/20081* (2013.01); *G06T 2207/20084* (2013.01); *G06T 2207/30224* (2013.01); *G06T 2207/30228* (2013.01)

(58) Field of Classification Search
CPC .......... G06K 9/00724; G06T 7/73; G06T 7/74
See application file for complete search history.

(56) References Cited

U.S. PATENT DOCUMENTS

2003/0049590 A1* 3/2003 Feldbau ............. A63B 24/0021
                                                          434/251
2006/0261945 A1* 11/2006 Schimmer ............. G01S 13/878
                                                          340/568.6
(Continued)

FOREIGN PATENT DOCUMENTS

CN     107622273 A     1/2018
CN     110114735 A     8/2019
(Continued)

OTHER PUBLICATIONS

Ferreira, et al., "Video Analysis in Indoor Soccer using a Quadcopter", ICPRAM 2015—International Conference on Pattern Recogniton Applications and Methods, pp. 77-86.
(Continued)

*Primary Examiner* — Wen W Huang
(74) *Attorney, Agent, or Firm* — Chip Law Group

(57) ABSTRACT

An electronic device is provided for image-based detection of offside in gameplay. The electronic device estimates positions of each player-object of a first team and a second team in a current image and further estimates displacement and velocity values of a soccer-object. The electronic device detects a pass state of the soccer-object based on the displacement and the velocity values. The electronic device determines a set of passive offside positions of a set of player-objects of the first team based on the estimated positions of the each player-object of the first team. The electronic device further detects an active offside state of at least one player-object in the set of player-objects, based on a first distance between the soccer-object and each of the set of player-objects, and transmits a notification to a referee of the gameplay, in real-time or near real time, based on the detected active offside state.

21 Claims, 11 Drawing Sheets

(51) Int. Cl.
*G06T 7/246* (2017.01)
*A63B 71/06* (2006.01)

(56) References Cited

U.S. PATENT DOCUMENTS

| | | | |
|---|---|---|---|
| 2009/0060352 A1* | 3/2009 | Distante | A63B 24/0021 382/224 |
| 2009/0256688 A1* | 10/2009 | Khan | A63B 24/0021 340/323 R |
| 2009/0298588 A1* | 12/2009 | Gopinath | A63B 24/0021 463/36 |
| 2011/0169959 A1* | 7/2011 | DeAngelis | G06K 9/00724 348/157 |
| 2012/0058829 A1* | 3/2012 | Yanagisawa | A63F 13/56 463/43 |
| 2014/0365551 A1* | 12/2014 | Mutschler | H04L 69/28 709/201 |
| 2015/0138188 A1* | 5/2015 | Gillard | G06T 15/00 345/419 |
| 2017/0124769 A1* | 5/2017 | Saito | G06F 3/048 |
| 2017/0318325 A1 | 11/2017 | Ortiz et al. | |
| 2018/0189971 A1* | 7/2018 | Hildreth | H04N 5/232 |
| 2019/0180468 A1 | 6/2019 | Hildreth | |

FOREIGN PATENT DOCUMENTS

| | | |
|---|---|---|
| EP | 1872334 A2 | 1/2008 |
| EP | 2983110 A2 | 2/2016 |
| EP | 3566103 A1 | 11/2019 |
| FR | 2841478 A1 | 1/2004 |
| FR | 2843849 A1 | 2/2004 |
| JP | 2008-538623 A | 10/2008 |
| TW | 201826131 A | 7/2018 |
| WO | 2006/111928 A2 | 10/2006 |
| WO | 2017/221078 A2 | 12/2017 |
| WO | 2018/004354 A1 | 1/2018 |
| WO | 2018/128671 A1 | 7/2018 |

OTHER PUBLICATIONS

Sanchez-Lopez, et al., "A System for the Design and Development of Vision-Based Multi-Robot Quadrotor Swarms", 2014 International Conference on Unmanned Aircraft Systems (ICUAS), May 2014, 1 page.

Yadav, et al., "A Real-Time Ball Trajectory Follower Using Robot Operating System", 2015 Third International Conference on Image Information Processing (ICIIP), Dec. 2015, 1 page.

D'Orazio, et al., "An Investigation into the Feasibility of Real-Time Soccer Offside Detection From a Multiple Camera System", IEEE Transactions on Circuits and Systems for Video Technology, vol. 19, No. 12, Dec. 2009, pp. 1804-1818.

Hashimoto, et al., "A System for Automatic Judgment of Offsides in Soccer Games", IEEE International Conference on Multimedia and Expo, Dec. 26, 2006, pp. 1889-1892.

Partial International Search Report of PCT Application No. PCT/IB2019/058448, dated Dec. 10, 2019, 17 pages.

\* cited by examiner

IMAGE-BASED DETECTION OF OFFSIDE IN GAMEPLAY

CROSS-REFERENCE TO RELATED APPLICATIONS/INCORPORATION BY REFERENCE

None.

FIELD

Various embodiments of the disclosure relate to image-based detection for sports. More specifically, various embodiments of the disclosure relate to an electronic device and a method for image-based detection of offside in gameplay.

BACKGROUND

Recent advancements in sports technology have led to the development of various in-match support systems, such as a video assistant referee (VAR), for analysis of a gameplay between two teams. Typically, conventional in-match support systems analyze the gameplay based on different types of sensor information, such as gameplay video feed and real time player information from multiple wearable devices worn by players in the gameplay. Based on the analysis, conventional in-match support systems may identify different match-specific events, such as a match goal or a foul, during the gameplay. Such conventional in-match support systems are prone to erroneous or false detection of match-specific events. Thus, a decision to refer to the analysis of such in-match support systems is made by an authorized person, such as the main referee or assistant referees, in the gameplay. Also, in order to make such decisions, it may be sometimes required to pause the gameplay while the referee refers to the analysis of such in-match support systems and adjudicate a decision for a match-specific event. This may introduce undesired delay to the gameplay and further affect a momentum of the players and/or the audience. Additionally, in certain cases, detection of such match-specific events may be performed based on human observations. There may be different limitations to human observations, such as attention issues under short response times and a limited cone of visual attention (such as 55° for humans), which may introduce errors in judgment made by the referees or assistant referees in the gameplay. Thus, an advanced system may be desired for real time or near real time detection of match-specific events, such as offside, without a significant delay or pause in the gameplay.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for image-based detection of offside in gameplay is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for image-based detection of offside in gameplay. Exemplary aspects of the disclosure provide an electronic device that may act as a smart video assistant referee (SVAR) for near real time or real time detection of offside in soccer matches. The disclosed electronic device provides a solution to reduce any erroneous detection of offside offences due to human errors and the offside offence missed due to limited cone of visual attention (e.g., 55 degrees) for human referees.

The disclosed electronic device may provide a dynamic offside detection in gameplay based on a deep neural network (DNN) model, such as a faster-regional convolution neural network (RCNN). The disclosed electronic device may provide an accurate and near-real time detection of the offside offense in the gameplay without a requirement for a break or an interruption in the momentum of the players of either side in the gameplay. Also, the disclosed electronic device doesn't require specialized wearable sensors on the soccer-object or the player-objects of either teams to detect the active offside state. The detection of the active offside state is based entirely on the sequence of image frames captured by the plurality of image sensors in real time or near real time during the gameplay on a match field. The disclosed electronic device may also provide an enhanced and automated detection of match-specific events, such as offside, without a requirement of a change in configuration the electronic device in accordance with a type, a size, and an audience of a stadium that has the match field.

Figure 1:
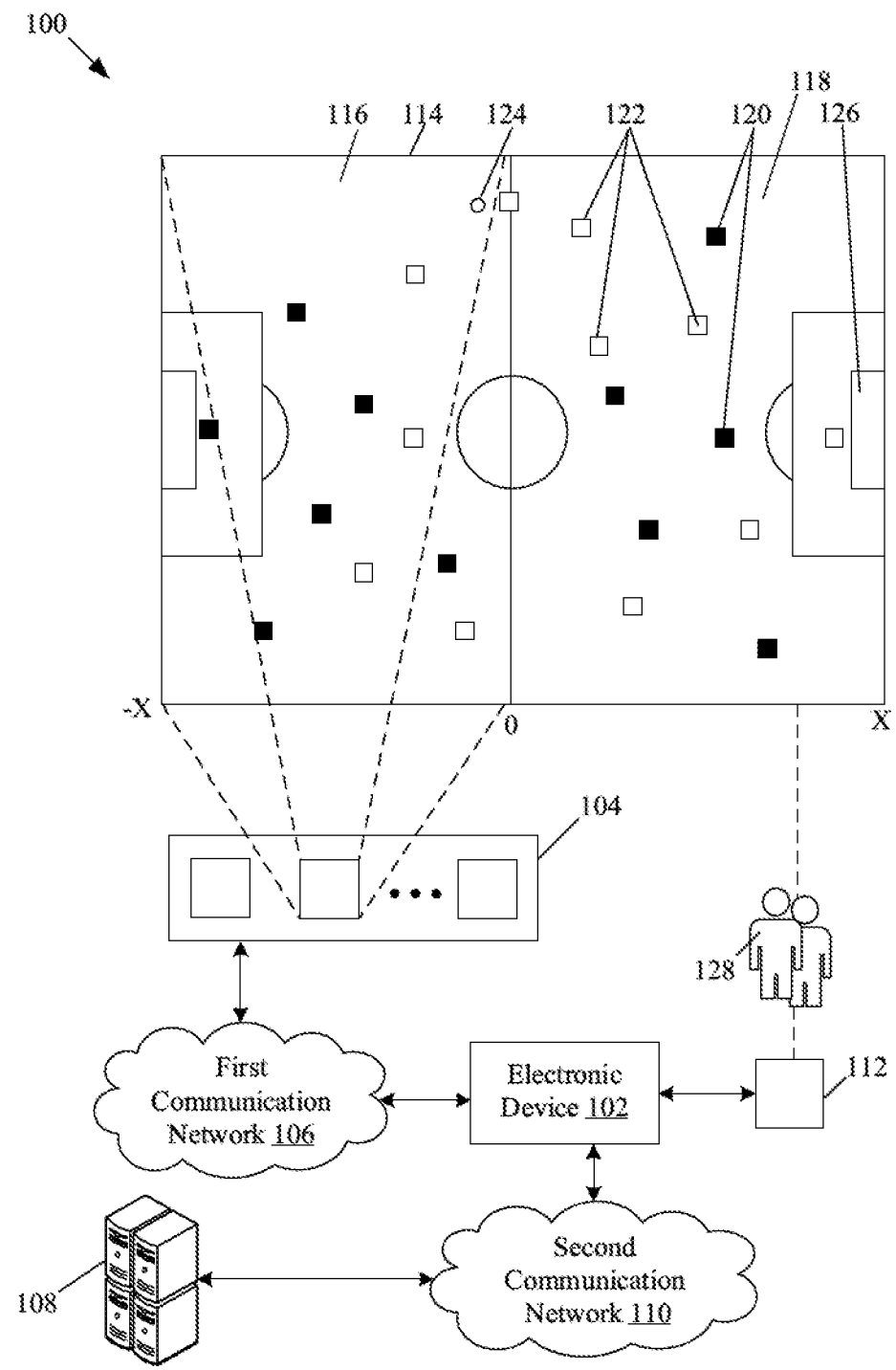
FIG. 1 is a block diagram that illustrates a network environment for image-based detection of offside in gameplay, in accordance with an embodiment of the disclosure.

FIG. 1 is a block diagram that illustrates a network environment for image-based detection of offside in gameplay, in accordance with an embodiment of the disclosure. With reference to FIG. 1, there is shown an exemplary network environment 100. The network environment 100 includes an electronic device 102 and a plurality of image sensors 104 communicatively coupled to the electronic device 102, via a first communication network 106. There is further shown a server 108 that may be communicatively coupled to the electronic device 102, via a second communication network 110. Alternatively, instead of two different communication networks, there may be a single communication network, such as the first communication network 106, for communication among the electronic device 102, the plurality of image sensors 104, and the server 108.

In accordance with an embodiment, the plurality of image sensors 104 may be positioned over a match field 114. The match field 114 may correspond to a soccer field or a soccer stadium. As per known sports conventions, the match field 114 may be divided into a first half 116 and a second half 118. A first plurality of player-objects of a first team 120 and a second plurality of player-objects of a second team 122 may be present in the match field 114 along with at least one referee, such as a referee 128. As an example, the first team 120 and the second team 122 may play from the first half 116 and the second half 118, respectively. The first team 120 and the second team 122 may correspond to soccer teams. There is further shown a soccer-object 124 in the match field 114. The second half 118 may include a goalpost 126 for the second team 122. The goalpost 126 may correspond to a soccer goalpost. There is further shown an external apparatus 112 that may be communicatively coupled to the electronic device 102.

The electronic device 102 may comprise suitable logic, circuitry, and interfaces that may be configured to process a sequence of image frames of the match field 114 to detect an active offside state in the gameplay of a first team (such as the first team 120) and a second team (such as the second team 122). The electronic device 102 may be communicatively coupled to the plurality of image sensors 104, the server 108, and the external apparatus 112. Examples of the electronic device 102 may include, but are not limited to, an imaging device, a 4K/HD server system, an in-stadium monitor, a motion-capture system, a camera phone, a projector, a computer workstation, a mainframe computer, a handheld computer, a cellular/mobile phone, a smart appliance, a video player, a large display screen, a television, and other computing devices. Examples of the imaging device may include, but is not limited to, a digital camera, a camcorder, a drone, a 4K/High Definition (HD) live camera for slow motion capture, an HD camera system, an HD/Standard Definition (SD) camera system, and a cable suspended camera system.

The plurality of image sensors 104 may comprise suitable logic, circuitry, interfaces, and/or code that may be configured to capture a sequence of image frames from a field-of-view (FOV) of the plurality of image sensors 104. The FOV corresponds to a view (such as a top view) of at least the first half 116, the second half 118, or a full size of the match field 114 and at least one of the first half 116 or the second half 118 of the match field 114 may correspond to a territory of the first team 120 or the second team 122. The captured sequence of image frames may correspond to a two-dimensional (2D) view or a three-dimensional (3D) view of the gameplay on the match field 114. Examples of the plurality of image sensors 104 may include, but are not limited to, an imaging sensor, a wide-angle camera, an action camera, digital cameras, a closed-circuit television (CCTV) camera, a camcorder, a time-of-flight camera (TOF camera), a night-vision camera, a 4K/HD live camera for slow motion, an HD system camera, an HD/SD system camera, and/or other image capturing devices. In certain embodiments, at least one image sensor of the plurality of image sensors 104 is present in at least a drone or a cable-suspended camera system for the match field 114.

Although FIG. 1 illustrates the plurality of image sensors 104 being separated from the electronic device 102, in some embodiments, the plurality of image sensors 104 may be integrated in the electronic device 102, without a deviation from the scope of the disclosure.

The first communication network 106 may include a communication medium through which the electronic device 102 and the plurality of image sensors 104 communicate with each other and other communication devices in the network environment 100. Examples of the first communication network 106 may include, but are not limited to, the Internet, Internet based mobile ad-hoc networks (IMANET), a cellular network, a long-term evolution (LTE) network, a cloud network, a Personal Area Network (PAN), a Local Area Network (LAN), a Metropolitan Area Network (MAN) and/or a Wide Area Network (WAN).

Various devices in the network environment 100 may be configured to connect to the first communication network 106, in accordance with protocols that comply with one or more wireless communication standards, such as Institute of Electrical and Electronics Engineers (IEEE)) standards. Examples of such wireless communication standards may include, but are not limited to, 802.3, 802.15.1, 802.16 (Wireless local loop), 802.20 (Mobile Broadband Wireless Access (MBWA)), 802.11-1997 (legacy version), 802.11a, 802.11b, 802.11g, 802.11e, 802.11i, 802.11F, 802.11c, 802.11h (specific to European regulations), 802.11n, 802.11j (specific to Japanese regulations), 802.11ac, 802.11ad, 802.11ah, 802.11aj, 802.11ax, 802.11 ay, 802.11az, 802.11 hr (high data rate), 802.11af (white space spectrum), 802.11-2007, 802.11-2008, 802.11-2012, 802.11-2016, 802.11p, 802.15, 802.16, 1609, Worldwide Interoperability for Microwave Access (Wi-MAX), Wireless Access in Vehicular Environments (WAVE), and cellular communication standards. Similarly, examples of wireless communication protocols may include, but are not limited to, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, Bluetooth, Radio Frequency Identification (RFID), Near field communication (NFC), Infrared communication, satellite communication, Narrow Band Wi-SUN, broadband, and/or other wireless communication protocols.

The server 108 may include suitable logic, circuitry, and interfaces that may be configured to collect and store team information that correspond to the first team 120 and the second team 122. The team information may include history of gameplays, team identities, such as team clothing patterns for home gameplays and away gameplays, and/or player information of the first team 120 and the second team 122. In accordance with an embodiment, the server 108 may be configured to store and continuously update the team information. In accordance with an embodiment, the server 108 may be configured to transmit the stored team information to the electronic device 102 through the second communication network 110.

In some embodiments, the server 108 may be implemented as a cloud server, which may be utilized to execute aforementioned operations of the server 108 through web applications, cloud applications, HTTP requests, repository operations, file transfer, gaming operations, and the like. Other examples of the server include, but are not limited to a media server, a live match-specific server, a database server, a file server, a web server, an application server, a mainframe server, a cloud server, or other types of servers.

The second communication network 110 may include a communication medium through which the electronic device 102 and the server 108 communicate with each other and other communication devices in the network environment 100. Examples of the second communication network 110 may include, but are not limited to, the Internet, Internet based mobile ad-hoc networks (IMANET), a cellular network, a long-term evolution (LTE) network, a cloud network, a Personal Area Network (PAN), a Local Area Network (LAN), a Metropolitan Area Network (MAN) and/or a Wide Area Network (WAN). Various devices in the network environment 100 may be configured to connect to the second communication network 110, in accordance with various wired or wireless communication standards. Examples of such communication standards may include, but are not limited to, IEEE 802.11, 802.11p, 802.15, 802.16, 1609, Worldwide Interoperability for Microwave Access (Wi-MAX), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, and/or other wireless communication protocols.

The external apparatus 112 may comprise suitable logic, circuitry, interfaces, and/or code that may be configured to display information associated with the gameplay in the match field 114, transmitted by the electronic device 102. In accordance with an embodiment, the external apparatus 112 may be configured to display the plurality of image frames captured by the plurality of image sensors 104. In accordance with an embodiment, the external apparatus 112 may be configured to display an image frame of the plurality of image frames that includes a set of player-objects in a set of passive offside positions. In accordance with an embodiment, the external apparatus 112 may be configured to display an image frame that corresponds to an active offside state of a player-object from the set of player-objects in the set of passive offside positions. In accordance with an embodiment, the external apparatus 112 may be integrated with a wearable device, such as a smart watch or a smart glass that may be worn by the referee 128 during the gameplay on the match field 114. The external apparatus 112 may be realized through several known technologies such as, but not limited to, at least one of a digital signage, in-stadium display, a billboard, a touch display, Liquid Crystal Display (LCD) display, a Light Emitting Diode (LED) display, a plasma display, and an Organic LED (OLED) display technology, and other displays.

In operation, the plurality of image sensors 104 may be configured to capture a sequence of image frames of the match field 114 where the gameplay between the first team 120 and the second team 122 may be in progress. The sequence of image frames may be captured from one or more views of the match field 114, such as the top view of the match field 114. In certain embodiments, the electronic device 102 is configured to control the plurality of image sensors 104 to track a movement of the first team 120, the second team 122, and the soccer-object 124 on the match field 114. Based on the tracked movements, the plurality of image sensors 104 may be configured to focus on regions on the match field 114 that correspond to an active play region associated with the soccer-object 124 and further capture the sequence of image frames with the active play region in focus.

In accordance with an embodiment, the sequence of image frames may correspond to a portion of either the first half 116 or the second half 118 of the match field 114 at a given time. The plurality of image sensors 104 may be configured to capture the sequence of image frames that includes player-objects from the first team 120 and the second team 122, respectively. The captured plurality of image frames may be utilized to determine information, such as positions of a first plurality of player-objects of the first team 120 and a second plurality of player-objects of the second team 122.

The plurality of image sensors 104 may be positioned at specific locations, such as around, in or above the match field 114. In some embodiments, the plurality of image sensors 104 may arranged as per a specific arrangement pattern at different aerial positions above the match field 114 to capture a top view of the gameplay. The specific arrangement pattern may change as per different durations in the gameplay or an occurrence of a match-specific event in the gameplay. In one such arrangement pattern, a first image sensor may be at an aerial position on top of the midline of the match field 114, a second image sensor may be at a first central aerial position above the first half 116 and a third image sensors may be at a second central aerial position above the second half 118 of the match field 114. In such cases, the plurality of image sensors 104 may be configured to capture the sequence of image frames from the top view of the match field 114.

In other embodiments, each image sensor of the plurality of image sensors 104 may be configured to capture the sequence of image frames from views that are different from the top view of the match field 114, i.e., from different directions (i.e. camera angles) and camera elevations with respect to the match field 114. Also, in some cases, the plurality of image sensors 104 may be configured to control motion of the plurality of image sensors 104 to capture a view of the match field 114 from different image sensor positions or different elevations with respect to the match field 114. Such control over the motion may help to capture the sequence of image frames from different elevation levels from the match field 114 such that each image sensor can access an unobstructed view of the match field 114.

At least one image frame of the sequence of image frames may include the soccer-object 124, the first plurality of player-objects of the first team 120 and the second plurality of player-objects of the second team 122. The soccer-object 124 may correspond to a soccer ball in the gameplay. The plurality of image sensors 104 may be further configured to transmit the sequence of image frames to the electronic device 102, via the first communication network 106 (e.g., a Wi-Fi network).

The electronic device 102 may be configured to receive and store the sequence of image frames from the plurality of image sensors 104. The electronic device 102 may be configured to detect the first plurality of player-objects and the second plurality of player-objects based on at least one of facial characteristics, a color, or a pattern associated with each player-object of the first plurality of player-objects and the second plurality of player-objects. Additionally, in some embodiments, the electronic device 102 may be configured to receive team information from the server 108, via the second communication network 110. The team information may include, but are not limited to, history of gameplays, team identities, and/or player information of the first team 120 and the second team 122.

The detection of each player-object of the first plurality of player-objects of the first team 120 and the second plurality of player-objects of the second team 122 may be done based on the team information. For example, the team information may include a team pattern of the first team 120. The electronic device 102 may be configured to recognize the player-objects of the first team 120 by matching the team pattern of the first team 120 to the player-objects in the sequence of image frames. Additionally, in some cases, the electronic device 102 may be further configured to detect and recognize the soccer-object 124 and the referee 128 in the sequence of image frames.

In some embodiments, each player-object of the first plurality of player-objects and the second plurality of player-objects may be detected using a trained machine learning model, such as a deep neural network. In such cases, the team information may act as supplementary information to label the first plurality of player-objects of the first team 120 and the second plurality of player-objects in the sequence of image frames.

The electronic device 102 may be further configured to estimate a position of each player-object of the first plurality of player-objects of the first team 120 and the second plurality of player-objects of the second team 122, based on the detection of player-objects from the first team 120 and the second team 122. The electronic device 102 may be further configured to estimate a set of displacement values and a set of velocity values of the soccer-object 124, based on the estimated position of the soccer-object 124 in each image frame of the sequence of image frames. For example, the set of displacement values and the set of velocity values may correspond to a change in the position of the soccer-object 124 and a rate of change in the position of the soccer-object 124, respectively, along a particular direction in the match field 114.

The electronic device 102 may be further configured to detect a pass state of the soccer-object 124 based on at least one of the estimated set of displacement values and the set of velocity values of the soccer-object 124. The pass state may correspond to a change in possession of the soccer-object 124 from one player-object (such as a first player-object) of the first team 120 to another player-object (such as a second player-object) of the first team 120. Alternatively stated, the pass state may further correspond to a release of the soccer-object 124 from the one player-object (of the first team 120) who is in possession of the soccer-object 124 to another player-object of the first team 120.

It may be noted here that the first team 120 or the second team 122 may correspond to an attacking team or a defending team in an image frame of the sequence of image frames, based on whether the soccer-object 124 is in the first half 116 or the second half 118 of the match field 114 and/or a player-object of which particular team is in possession of the soccer-object 124. The detection of the pass-state of the soccer-object 124 between two player-objects of the first team 120 (such as the attacking team) is described in detail, for example, in FIGS. 3A, 3B, 4, and 5.

The electronic device 102 may be further configured to determine a set of passive offside positions in an image frame of the sequence of image frames. The set of passive offside positions may correspond to a set of player-objects of the first plurality of player-objects of the first team 120 (such as an attacking team) based on the estimated positions of the first plurality of player-objects of the first team 120. The determination of the set of passive offside positions of the first team 120 is described in detail, for example, in FIGS. 3A, 3B, 4, and 6.

As an example, the set of passive offside positions of the set of player-objects of the first team 120 (such as the attacking team) may be determined based on a position of the second last player-object of the second team 122 (such as the defending team). The electronic device 102 may be configured to determine a position of the second last player-object of the second team 122 based on the estimated positions of the second plurality of player-objects of the second team 122 (such as a defending team). The second last player-object of the second team 122 may correspond to a detected player-object on the match field 114 who is at a position that is second last to a position of last player-object (such as a goalkeeper-object of the second team 122). The position of last player-object of the second team 122 may be closest from the goalpost 126 of the second team 122.

In order to determine whether a player-object of the set of player-objects in the determined passive offside position has committed an offside offense, i.e. also referred to as an active offside state, the electronic device 102 may be configured to compute a first distance value(s) between the soccer-object 124 and at least one player-object in the determined set of passive offside position(s). The electronic device 102 may be further configured to compare the computed first distance value(s) with a threshold distance value. The electronic device 102 may be further configured to detect an active offside state of a player-object in the passive offside position based on the comparison of the computed first distance value(s) with the threshold distance value. The player-object in the active offside state may be the second player-object who receives (i.e. almost takes into possession) the soccer-object 124 from the first player-object. The detection of the active offside state is described in detail, for example, in FIGS. 3A, 3B, 4, and 7.

In accordance with an embodiment, the electronic device 102 may be further configured to generate an offside status image based on the detected active offside state. The offside status image may correspond to a modification of an image frame of the sequence of image frames, in which the set of passive offside positions are determined. The offside status image may include an offside identifier, such as a line passing through the detected position of a reference player-object, such as a second-last player-object, of the second team 122 (such as the defending team) in the image frame.

In accordance with an embodiment, the electronic device 102 may be further configured to control a display of offside information on a display screen (i.e. the external apparatus 112) based on the detected active offside state. Examples of the offside information may include, but are not limited to, details of the player-object (of the first team 120 such as the attacking team) who committed the offside offense and/or the second-last player-object of the second team 122 (such as the defending team), and a time at which the offside offence was committed.

In accordance with an embodiment, the electronic device 102 may be further configured to transmit a notification to the external apparatus 112, based on the detected active offside state. In some cases, the notification may also include offside information. The external apparatus 112 may be a wearable device worn by the referee 128 on the match field 114. The notification may include, but is not limited to a sound, a vibration, a haptic feedback, an image-based alert, a push notification, and a ringtone. The display of the notification on the external apparatus 112 is described in detail, for example, in FIG. 8. The referee 128 may, at any time on or after receipt of the notification, decide and further adjudicate the offside offence during the gameplay between the first team 120, in response to the received notification. The decision and formal adjudication may be done without a break (such as a pause) in the gameplay. However, in certain cases, the referee 128 may decide to take a pause in gameplay to refer to assistant referees for a final judgment over the detection of the active offside state.

The disclosed electronic device 102 may provide an accurate and near-real time detection of the offside offense in the gameplay without a requirement for a break or an interruption in the momentum of the players of either side in the gameplay. Also, the disclosed electronic device 102 doesn't require specialized wearable sensors on the soccer-object 124 or the player-objects of either teams to detect the active offside state. The detection of the active offside state may be based entirely on the sequence of image frames captured by the plurality of image sensors 104 in real time or near real time during the gameplay on the match field 114. The disclosed electronic device 102 may also provide an enhanced and automated match-specific events, such as offside, without a requirement of a change in configuration the electronic device 102 in accordance with a type, a size, and an audience of a stadium that has the match field 114.

Figure 2:
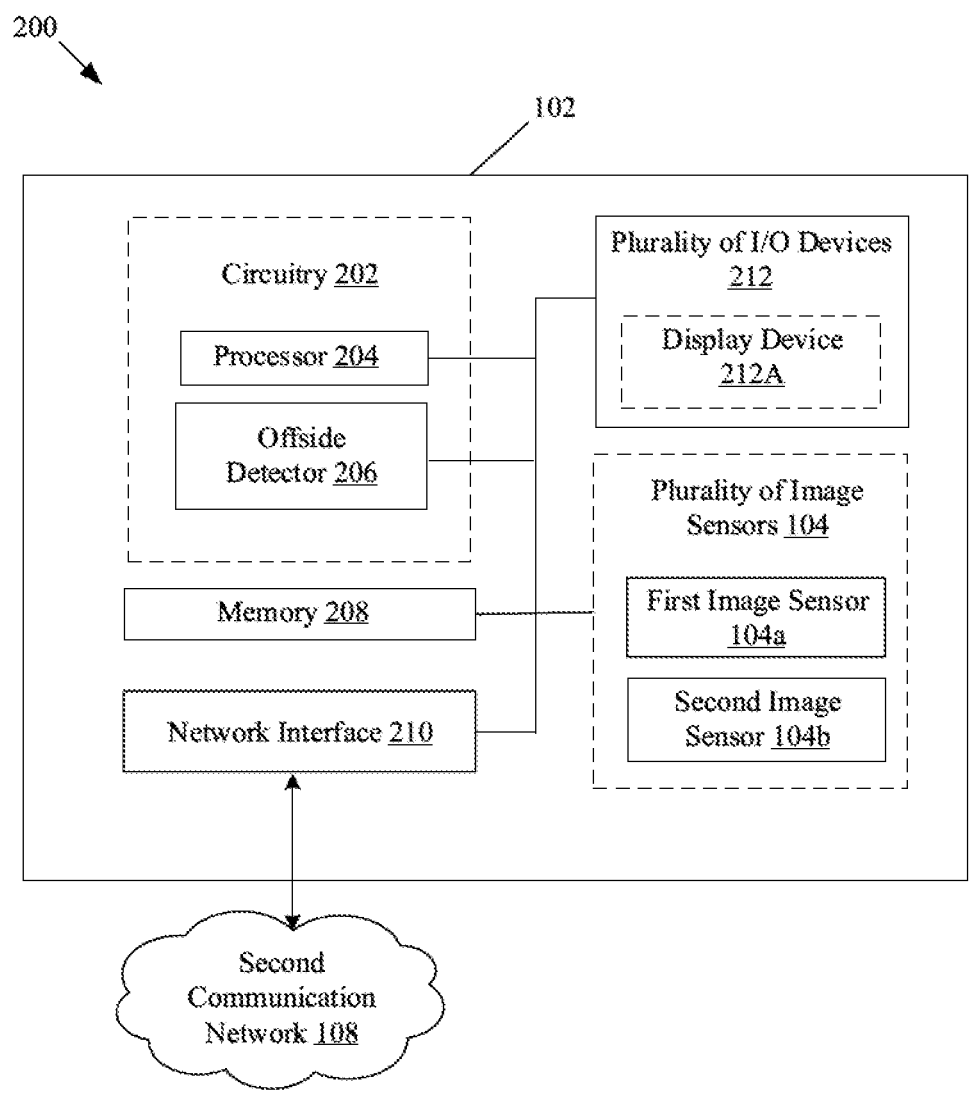
FIG. 2 is a block diagram of an electronic device for image-based detection of offside in gameplay, in accordance with an embodiment of the disclosure.

FIG. 2 is a block diagram of an electronic device for image-based detection of offside in gameplay, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, which may include a processor 204 and an offside detector 206. There is further shown a memory 208, a network interface 210, a plurality of Input/output (I/O) devices 212, and the plurality of image sensors 104 (as shown in FIG. 1). The plurality of I/O devices 212 may include a display device 212A. The plurality of image sensors 104 may include a first image sensor 104A and a second image sensor 104B. The circuitry 202 may be communicatively coupled with the plurality of image sensors 104, the memory 208, the network interface 210, and the plurality of I/O devices 212, via a set of communication ports/channels.

The processor 204 may include suitable logic, circuitry, and interfaces that may be configured to execute a set of instructions stored in the memory 208. The processor 204 may be configured to retrieve the sequence of image frames stored in the memory 208. In some embodiments, the processor 204 may be configured to receive the sequence of image frames directly from an on-chip memory of the plurality of image sensors 104. In certain embodiments, the processor 204 is configured to control the plurality of image sensors 104 to track a movement of the first team 120, the second team 122, and the soccer-object 124 and further capture the sequence of image frames with an active play region in focus. The processor 204 may be further configured to retrieve and store team information associated with the first team 120 and the second team 122 from the server 108, via the network interface 210. The processor 204 may be further configured to output a notification that corresponds to an active offside state (i.e. information associated with an offside offense) to the referee 128 through the plurality of I/O devices 212. The processor 204 may be implemented based on a number of processor technologies known in the art. Examples of the processor technologies implemented for the processor 204 may include, but are not limited to, a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The offside detector 206 may include suitable logic, circuitry, and/or interfaces that may be configured to determine a set of passive offside positions of a set of player-objects of the first team 120 (such as an attacking team), based on the positions of the first plurality of player-objects of the first team 120. The offside detector 206 may be further configured to detect an active offside state of a player-object at the passive offside position based on a distance between the player-object and the soccer-object 124. The offside detector 206 may be further configured to generate offside information that comprises an offside indicator based on the detected active offside state. In accordance with an embodiment, the offside detector 206 may be further configured to output the notification that comprises the generated offside information on the display device 212A. Examples of implementations of the offside detector 206 may include, but are not limited to, an inference engine circuitry, a neural network circuitry, a co-processor, a Graphics Processing Unit (GPU), a RISC processor, an ASIC processor, a CISC processor, a microcontroller, a CPU, or other control circuits.

The memory 208 may include suitable logic, circuitry, and interfaces that may be configured to store a set of instructions executable by the processor 204. The memory 208 may be configured to store the sequence of image frames captured by the plurality of image sensors 104. In some embodiments, the memory 208 may be configured to store the team information of the first team 120 and the second team 122 received from the server 108. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The network interface 210 may include suitable logic, circuitry, and interfaces that may be configured to establish communication between the electronic device 102, the plurality of image sensors 104, the server 108, and the external apparatus 112, via the first communication network 106 and second communication network 110. The network interface 210 may be implemented by various known technologies to support wired or wireless communication of the electronic device 102 with the first communication network 106 and second communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

The plurality of I/O devices 212 may include suitable logic, circuitry, and interfaces that may be configured to provide an I/O channel/interface to a user, such as the referee 128, to access different functions of the electronic device 102 and/or the external apparatus 112. The plurality of I/O devices 212 may receive a user input from the user, such as the referee 128, and present an output based on the provided user input. The plurality of I/O devices 212 may include various input and output ports to connect various other I/O devices that may communicate with different operational components of the electronic device 102. Examples of the input device may include, but is not limited to, a touch screen, a keyboard/keypad, a set of buttons, a mouse, a joystick, a microphone, and an image-capture device. Examples of the output device may include, but is not limited to, a display (for example, the display device 212A), a speaker, and a haptic or any other output device.

The display device 212A may include suitable logic, circuitry, and interfaces that may be configured to render the sequence of image frames and/or the team information onto the display device 212A. The display device 212A may be realized through several known technologies such as, but not limited to, at least one of a Liquid Crystal Display (LCD) display, a Light Emitting Diode (LED) display, a plasma display, and an Organic LED (OLED) display technology, and other display technologies that may be well known to one skilled in the art. In accordance with an embodiment, the display device 212A may refer to a display screen of a smart-glass device, a see-through display, a projection-based display, an electro-chromic display, and a transparent display.

Although FIG. 2 illustrate the operations of the circuitry 202 being distributed between the processor 204 and the offside detector 206, in some embodiments, there may be only the processor 204 as the circuitry 202 and the entire operations of the offside detector 206 may be executed by the processor 204, without a deviation from the scope of the present disclosure. The functions or operations executed by the electronic device 102, as described in FIG. 1, may be performed by the circuitry 202, such as the processor 204 and the offside detector 206. The details of the operation of the circuitry 202 is further described, for example, in the FIGS. 3A, 3B 4, 5, 6, 7, and 8.

Figure 3A:
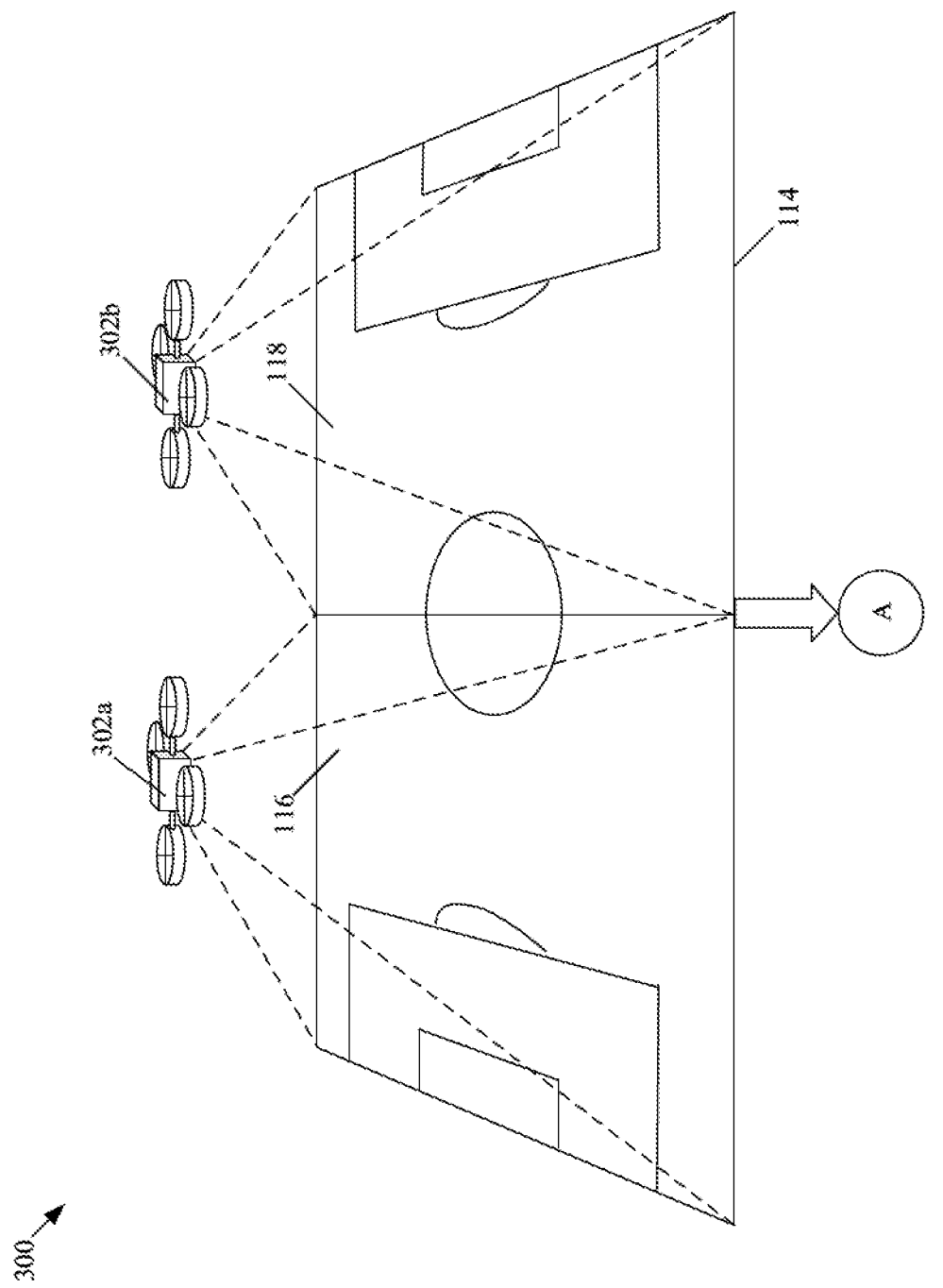
FIGS. 3A and 3B, collectively, illustrate an exemplary scenario for image-based detection of offside in gameplay, in accordance with an embodiment of the disclosure.
Figure 3B:
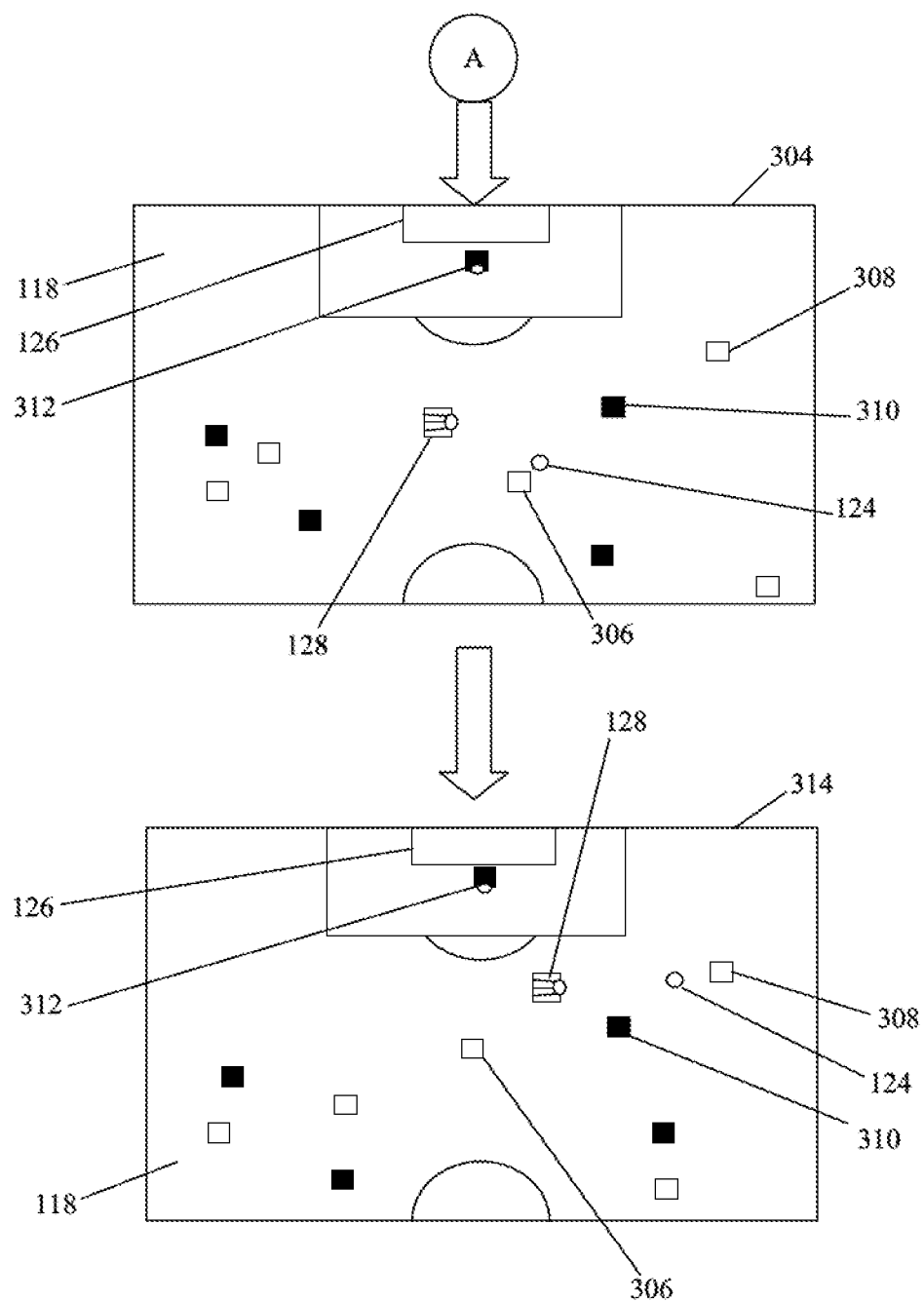

FIGS. 3A and 3B, collectively, illustrate an exemplary scenario for image-based detection of offside in gameplay, in accordance with an embodiment of the disclosure. FIGS. 3A and 3B are explained in conjunction with elements from FIGS. 1 and 2. With reference to FIG. 3A, there is shown a first environment 300 for implementation of the electronic device 102. The first environment 300 may include a first drone 302a and a second drone 302b present over and above the match field 114 at a particular elevation. The first drone 302a may include the first image sensor 104a and the second drone 302b may include the second image sensor 104b. Alternatively, the first image sensor 104a and the second image sensor 104b may be installed in cable suspended cameras over and above the match field 114 at a particular elevation. Although, for the sake of brevity, only two image sensors have been shown in FIG. 3A, in some embodiments, there may be more than two image sensors (within multiple cable-suspended cameras or drones) present over and above the match field 114 to cover an active play region as well as the remaining regions of the match field 114.

The first image sensor 104a and the second image sensor 104b may have a top view of the match field 114. With the top view, relative positions of different objects in each image frame of the sequence of image frames may be same as if different objects are projected on a flat 2D rectangular plane. Alternatively, the first image sensor 104a and the second image sensor 104b may have an elevated view (such as a bird's eye view) of the match field 114.

In accordance with an embodiment, the processor 204 may be configured to control movements of the drone 302A and the drone 302B in a plane parallel to that of the match field 114. Also, the processor 204 may be configured to control an elevation of the drone 302A and the drone 302B in a direction perpendicular to the match field 114. Hereinafter, the control of the movement and the elevation of the drone 302A and the drone 302B with respect to the match field 114 may correspond to a control of the movement and the elevation of the first image sensor 104a and the second image sensor 104b, respectively.

In accordance with an embodiment, the processor 204 may be configured to control movement of the first image sensor 104a and the second image sensor 104b based on the position of the soccer-object 124 (as shown in FIG. 1) on the match field 114. The processor 204 may be configured to control an elevation of the first image sensor 104a and the second image sensor 104b based on the position of the soccer-object 124 on the match field 114. For example, the processor 204 may be configured to move the first image sensor 104a and the second image sensor 104b to a specific elevation to get a clearer unobstructed view of different objects in the match field 114, such as the soccer-object 124, the first plurality of player-objects of the first team 120 or the second plurality of player-object of the second team 122.

In accordance with an embodiment, the processor 204 may be configured to control a movement of the first image sensor 104a over the match field 114 such that the first image sensor 104a remains stationary over a center point of the first half 116 of the match field 114 during the gameplay. The processor 204 may be further configured to control a movement of the second image sensor 104b over the match field 114 such that the second image sensor 104b remains stationary over a center point of the second half 118 of the match field 114 during the gameplay.

The processor 204 may be configured to control the first image sensor 104a and the second image sensor 104b to capture a sequence of image frames of the first half 116 and the second half 118 of the match field 114, respectively. Alternatively, the processor 204 may be configured to control the first image sensor 104a and the second image sensor 104b to capture the sequence of image frames of the match field 114.

In accordance with an embodiment, the first image sensor 104a and the second image sensor 104b may be configured to store a template that corresponds to coordinates of the match field 114. Alternatively, the template may be retrieved from a server, such as the server 108. The first image sensor 104a and the second image sensor 104b may be configured to capture the sequence of image frames based on the template. The first image sensor 104a and the second image sensor 104b may be configured to superimpose the template onto the captured sequence of image frame such that the coordinates of each position of the match field 114 may be represented in the sequence of image frames. The processor 204 may be further configured to determine the positions of the soccer-object 124, each player-object of the first plurality of player-objects of the first team 120 and each player-object of the second plurality of player-objects of the second team 122 based on the template.

In accordance with an embodiment, the processor 204 may be configured to detect the first plurality of player-objects and the second plurality of player-objects based on at least one of facial characteristics, a color, or a pattern associated with each player-object of the first plurality of player-objects and the second plurality of player-objects. Also, in some embodiments, the first plurality of player-objects and the second plurality of player-objects may be further detected based on the team information received from the server 108. The team information may include a history of gameplays, team identities, such as team clothing patterns for home gameplays and away gameplays, and/or player information of the first team 120 and the second team 122. For example, the team information may include a team pattern of the first team 120.

In some embodiments, the processor 204 may be configured to estimate a first identifier for the first team 120, a second identifier for the second team 122, and a third identifier for the referee 128 in the match field 114. The first identifier, the second identifier, and the third identifier may be estimated based on a deep neural network (DNN) model. Also, the detection of the first plurality of player-objects and the second plurality of player-objects may be done based on the DNN model. The DNN model for object detection is well known in the art and therefore, the details have been omitted from the disclosure for the sake of brevity. In certain embodiments, the DNN model may be based on a Faster Region-based Convolutional Neural Network (Faster-RCNN) model. The DNN model may be pre-trained based on a match dataset. The DNN model may be pre-trained based on a match dataset that includes a plurality of image frames of historical gameplays of a plurality of soccer teams. Also, the match dataset may correspond to the team information associated with the first team 120 and the second team 122. For example, the processor 204 may be configured to match clothing information (as part of the team information) worn by the first team 120 and the second team 122 in previous gameplays to the current gameplay and recognize the first plurality of player-objects and the second plurality of player-objects.

In accordance with an embodiment, the processor 204 may be configured to recognize the first plurality of player-objects of the first team 120 based on a defined team pattern for the first team 120 and the first plurality of player-objects in each image frame of the sequence of image frames. The electronic device 102 may be further configured to detect the soccer-object 124 and the referee 128 on the match field 114.

In accordance with an embodiment, the processor 204 may be configured to assign a 'zero' value to a midline of the match field 114 such that each point on the midline may be considered as a start point for the estimation of a position of each player of the first plurality of player-objects and the second plurality of player-objects (as shown in FIG. 1). The processor 204 may be further configured to assign a value of "−X" to a first end in the first half 116 of the match field 114 and a value of "+X" to a second end in the second half 118 of the match field 114. Alternatively stated, all the position values in the captured sequence of image frames for the first half 116 may be measured from the first end (i.e. "−X") to the midline (i.e. "0"). Also, all the position values in the captured sequence of image frames for the second half 118 may be measured from the midline (i.e. "0") to the second end (i.e. "+X").

With reference to FIG. 3B, there is shown a plurality of image frames of the sequence of image frames for detection of offside by the electronic device 102. The plurality of image frames may correspond to a top view of a portion (such as the second half 118) of the match field 114, captured by one of the plurality of image sensor 104. The plurality of image frames may include a first image frame 304 that may correspond to a current image frame and a second image frame 314 that may correspond to a successive image frame. In accordance with an embodiment, the first image frame 304 and the second image frame 314 may be consecutive image frames of the sequence of image frames.

The processor 204 may be configured to estimate, from the current image frame (such as the first image frame 304) of the sequence of image frames, a position of each player-object of the first plurality of player-objects of the first team 120 and each player-object of the second plurality of player-objects of the second team 122. The first team 120 may be in play with the second team 122. As shown in the first image frame 304, the first plurality of player-objects may include a first player-object 306, a second player-object 308 of the first team 120 and a reference player-object 310 (i.e. a second last player-object) and a goal keeper-object 312 of the second team 122. Also, in the second image frame 314, the second plurality of player-objects may further include the first player-object 306, the second player-object 308, the reference player-object 310, and the goal keeper-object 312 at different positions to that from the first image frame 304.

The processor 204 may be further configured to estimate a set of displacement values and a set of velocity values of the soccer-object 124 based on a position parameter of the soccer-object 124 in a previous image frame, the current image frame, and the successive image frame (such as the second image frame 314) of the sequence of image frames. The position parameter may correspond to a position value of the soccer-object 124 in each of the previous image frame, the current image frame, and the successive image frame.

As an example, the set of displacement values may correspond to a difference in pixel positions (such as at a center of the soccer-object 124) between the previous image frame and the current image frame along a horizontal direction and a vertical direction. Such difference in pixel positions may be measured in terms of a shift in a number of pixels from the center of the soccer-object 124 in the previous image frame to the current image frame and from the current image frame to the successive image frame. Similarly, the set of velocity values of the soccer-object 124 may correspond to a rate of change in a position (or shift of the center of the soccer-object 124) of the soccer-object 124 along both the horizontal and vertical directions, measured in pixels per second.

In accordance with an embodiment, the processor 204 may be configured to iteratively select each image frame from the sequence of image frames as a current image frame. The detection of offside may be initialized based on a determination that whether a player-object from the first team 120 (in possession of the soccer-object 124) makes a pass of the soccer-object 124 to another player-object of the first team 120. As shown in the current image frame, the first player-object 306 of the first team 120 may have made a pass to a second player-object 308 of the first team 120.

The offside detector 206 may be configured to detect a pass state of the soccer-object 124. The pass state may be detected based on the set of displacement values and the set of velocity values of the soccer-object 124, which may be further estimated from the previous image frame, the current image frame, and the successive image frame. The detected pass state may correspond to a release of the soccer-object 124 from a first player-object 306 of the first plurality of player-objects towards at least one player-object (such as the second player-object 308) of the first plurality of player-objects. The details of the detection of the pass state is further described, for example, in FIG. 4.

In accordance with an embodiment, the offside detector 206 may be further configured to determine a distance of each player-object of the first plurality of player-objects of the first team 120 and the second plurality of player-objects of the second team 122 from the midline of the match field 114 (as shown in FIG. 1). The offside detector 206 may be further configured to arrange the estimated position of each of the first plurality of player-objects and the second plurality of player-objects in an ascending order separately as per their respective territories in the match field 114. For example, the first half 116 corresponds to the first team 120 and the offside detector 206 may be configured to arrange the estimated position (e.g., an absolute position value) of each of the first plurality of player-objects of the first team 120 in an ascending in the first half 116. The goal keeper-object 312 of the second team 122 may have a maximum position value among first player-object 306, the second player-object 308, and the reference player-object 310.

The offside detector 206 may be further configured to determine, from the current image frame (such as the first image frame 304), a set of passive offside positions of a set of player-objects from the first plurality of player-objects. The set of passive offside positions may be determined based on the estimated position of each player-object of the first plurality of player-objects in the current image frame. As an example, the set of player-objects may include the second player-object 308 at a passive offside position in the current image frame. The passive offside position may correspond to a state, where an estimated position of the second player-object 308 may be higher (in ascending order of arrangement) than an estimated position of the reference player-object 310 (i.e. a second last player-object of the second team 122) in the half of the second team 122. Alternatively, a distance of the second player-object 308 may be greater that a distance of the reference player-object 310 (i.e. a second last player-object) from the midline of the match field 114. The distance of each of the set of player-objects from the goalpost 126 of the second team 122 may be less than the estimated position of the reference player-object 310 from the goalpost 126. The details of the determination of the set of passive offside positions are further described in detail, for example, in FIG. 5.

The offside detector 206 may be further configured to determine a first distance value between the soccer-object 124 and the second player-object 308. The offside detector 206 may be further configured to detect the active offside state, based on the determined first distance value distance between the soccer-object 124 and the second player-object 308 in the passive offside position in the current image frame. The active offside state may correspond to an offside offense committed by the at least one player-object of an attacking team (such as the first team 120) within a duration of a gameplay. The details of the detection of the active offside state are further described in detail, for example, in FIG. 6.

Figure 4:
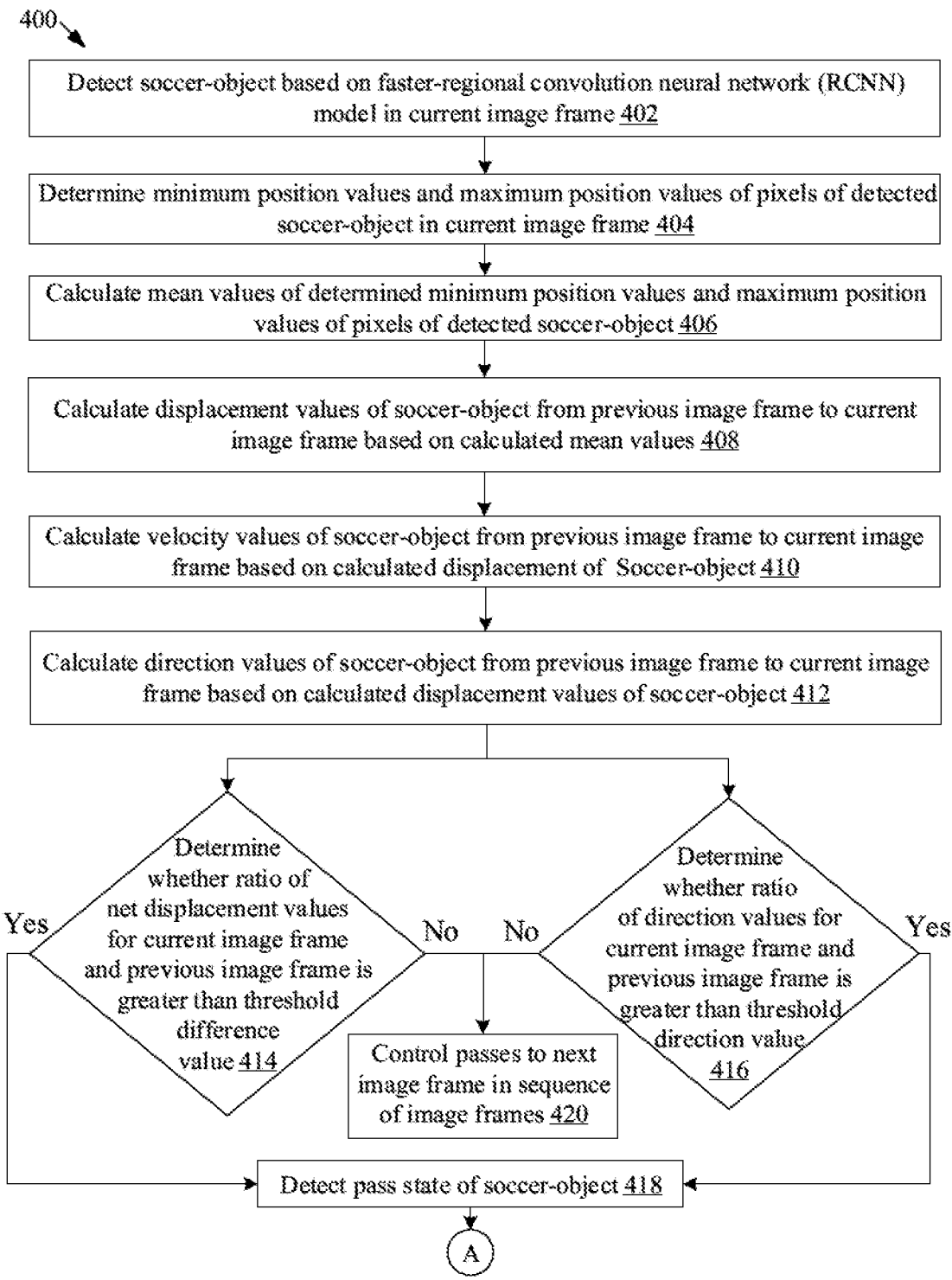
FIG. 4 is a flowchart that illustrates exemplary operations for detection of a pass state of a soccer-object in a sequence of image frames, in accordance with an embodiment of the disclosure.

FIG. 4 is a flowchart that illustrates exemplary operations for detection of a pass state of a soccer-object in a sequence of image frames, in accordance with an embodiment of the disclosure. FIG. 4 is explained in conjunction with elements from FIGS. 1, 2, 3A, and 3B. With reference to FIG. 4, there is shown a flowchart 400 of the electronic device 102.

At 402, the soccer-object 124 may be detected based on a faster-RCNN model in the current image frame. The processor 204 may be configured to detect the soccer-object 124 in the current image frame of the sequence of image frames of the match field 114 based on the faster-RCNN model.

At 404, minimum position values and maximum position values of pixels of the detected soccer-object 124 may be determined in the current image frame. The offside detector 206 may be configured to determine a minimum coordinate value ($X_{min}$ and $Y_{min}$) and a maximum coordinate value ($X_{max}$ and $Y_{max}$) along XY-axes in the current image frame. Here, $X_{min}$, $X_{max}$, $Y_{min}$ and $Y_{max}$ may correspond to pixel positions along the contour of the soccer-object 124 in the current image frame.

At 406, mean values of the determined minimum position values and the maximum position values of pixels of the detected soccer-object 124 may be calculated. The offside detector 206 may be configured to calculate a mean ($Y_N$ and $X_N$) of the determined minimum coordinate value ($X_{min}$ and $Y_{min}$) and a maximum coordinate value ($X_{max}$ and $Y_{max}$) along XY-axes, respectively, in the current image frame. The mean ($X_N$ and $Y_N$) may correspond to a center position of the soccer-object 124 in the match field 114, as shown in the current image frame. The mean ($X_N$ and $Y_N$) may be given by equations (1) and (2), as follows:

$$X_N = (X_{min} + X_{max})/2 \quad (1)$$

$$Y_N = (Y_{min} + Y_{max})/2 \quad (2)$$

where,
$N \in \{0, 1, 2, 3 \ldots, N\}$ and N is an index of an image frame in the sequence of image frames.

For example, $X_N$ and $Y_N$ of the soccer-object 124 with $X_{min}=5$ and $Y_{min}=10$, and $X_{max}=5.6$ and $Y_{max}=10.6$ may be $X_N=5.3$ and $Y_N=10.3$, respectively, using the equations (1) and (2). The mean ($X_N$ and $Y_N$) may be calculated for each image frame of the sequence of image frames.

At 408, displacement values of the soccer-object 124 from the previous image frame to the current image frame may be calculated based on the calculated mean values. The offside detector 206 may be configured to calculate the displacement values of the soccer-object 124 between two consecutive image frames of the sequence of image frames, such as the previous image frame and the current image frame. The displacement values may be calculated based on the calculated mean ($X_N$ and $Y_N$) for the current image frame and the previous image frame. The displacement of the soccer-object 124 may be calculated along the XY-axes. The displacement along an X-axis may correspond to $V_{XN}$ and the displacement along a Y-axis may correspond to $V_{YN}$, which is given by equations (3) and (4), respectively, as follows:

$$V_{XN} = X_N - X_{N-1} \quad (3)$$

$$V_{YN} = Y_N - Y_{N-1} \quad (4)$$

In equations (3) and (4), N may correspond to the current image frame and N−1 may correspond to the previous image frame. $V_{XN}$ and $V_{YN}$ for different values of N may correspond to the set of displacement values.

At 410, velocity values of the soccer-object 124 from the previous image frame to the current image frame may be calculated based on the calculated displacement values. The offside detector 206 may be configured to calculate the velocity values of the soccer-object 124, based on calculated displacement values in two consecutive image frames, such the displacement values from the previous image frame (N−1) to the current image frame (N). The velocity values along the X-axis may correspond to $V_{XN}$ and velocity values along the Y-axis may correspond to $V_{YN}$, as shown by equations (3) and (4), respectively.

At 412, direction values of the soccer-object 124 may be calculated from the previous image frame to the current image frame, based on the calculated displacement values of the soccer-object 124. The offside detector 206 may be configured to calculate a direction value $V_{TN}$ of the soccer-object 124 in the current image frame based on the calculated displacement values and the calculated velocity values of the soccer-object 124 along the X-axis and the Y-axis, respectively. The direction value $V_{TN}$ may be given by equation (5), as follows:

$$V_{TN} = (Y_N - Y_{N-1})/(X_N - X_{N-1}) \quad (5)$$

At 414, it may be determined whether a ratio of net displacement values for the current image frame and the previous image frame is greater than a threshold difference value. The offside detector 206 may be configured to determine whether a ratio of a first net displacement value for the current image frame and a second net displacement value for the previous image frame is greater than the threshold difference value (e.g., 0.3 or 30%).

In accordance with an embodiment, the offside detector 206 may be configured to compute a ratio of the first net displacement value and the second net displacement value based on the estimated set of displacement values. The first net displacement value may correspond to a displacement of the soccer-object 124 from the previous image frame to the current image frame. Similarly, the second net displacement value may correspond to a displacement of the soccer-object 124 from the current image frame to the successive image frame. The offside detector 206 may be further configured to compare the computed ratio with the threshold difference value and detect the pass state based on the comparison of the computed ratio with the threshold difference value.

The condition for such determination may be given by equation (6), as follows:

$$|\sqrt{V_{YN}^2+V_{XN}^2}/\sqrt{V_{YN-1}^2+V_{XN-1}^2}|>T_1 \quad (6)$$

where, $T_1$ represents the threshold difference value, e.g., 0.3 or 30%;

|.| represents an absolute value function;

$\sqrt{(V_{YN}^2+V_{XN}^2)}$ represents the first net displacement value for the current image frame (N); and $\sqrt{(V_{YN-1}^2+V_{XN-1}^2)}|$ represents the second net displacement value for the previous image frame (N−1). In case the condition of the equation (6) is satisfied, control passes to 418. Otherwise, the control passes to 420.

At 416, it may be determined whether a ratio of the direction values for the current image frame and the previous image frame is greater than a threshold direction value. In case, the ratio of the direction values for the current image frame and the previous image frame is greater than the threshold direction value, control passes to 418. Otherwise, control passes to 420 and the offside detector 206 may be configured repeat the process of the flowchart 400 for the next image frame, such as the subsequent image frame, after the current image frame.

In accordance with an embodiment, the offside detector 206 may be configured to determine a first direction value and a second direction value based on a first displacement value and a second displacement value of the estimated set of displacement values. The first displacement value and the second displacement value correspond to the current image frame and the previous image frame, respectively. The offside detector 206 may be further configured to compare a ratio of the first direction value and the second direction value to a threshold direction value, e.g., 0.15. The offside detector 206 may be configured to detect the pass state based on the comparison of the ratio with the threshold direction value.

The offside detector 206 may be configured to determine whether a condition given by equation (7) may be satisfied for the current image frame. The condition for such determination may be given by equation (7), as follows:

$$|V_{TN}/V_{TN-1}|>T_2 \quad (7)$$

Where, $T_2$ represents the threshold direction value;

|.| represents an absolute value function;

$V_{TN}$ and $V_{TN-1}$ represents the first direction value for the current image frame (N); and $V_{TN-1}$ represents the second direction value for the previous image frame (N−1).

In accordance with an embodiment, the offside detector 206 may be configured to detect the pass state based on whether one of conditions (given in the equations (6) or (7)) is satisfied. In accordance with an embodiment, the offside detector 206 may be configured to detect the pass state based on whether both conditions (given in the equations (6) or (7)) are satisfied.

At 418, the pass state of the soccer-object 124 may be detected. The offside detector 206 may be configured to detect the pass state of the soccer-object 124 in the current image frame based on whether the condition given by equation (6) or equation (7) is satisfied.

At 420, control passes to a next image frame in the sequence of image frames. The offside detector 206 may be configured repeat the process of the flowchart 400 for the next image frame (i.e. a subsequent image frame) after the current image frame.

Figure 5:
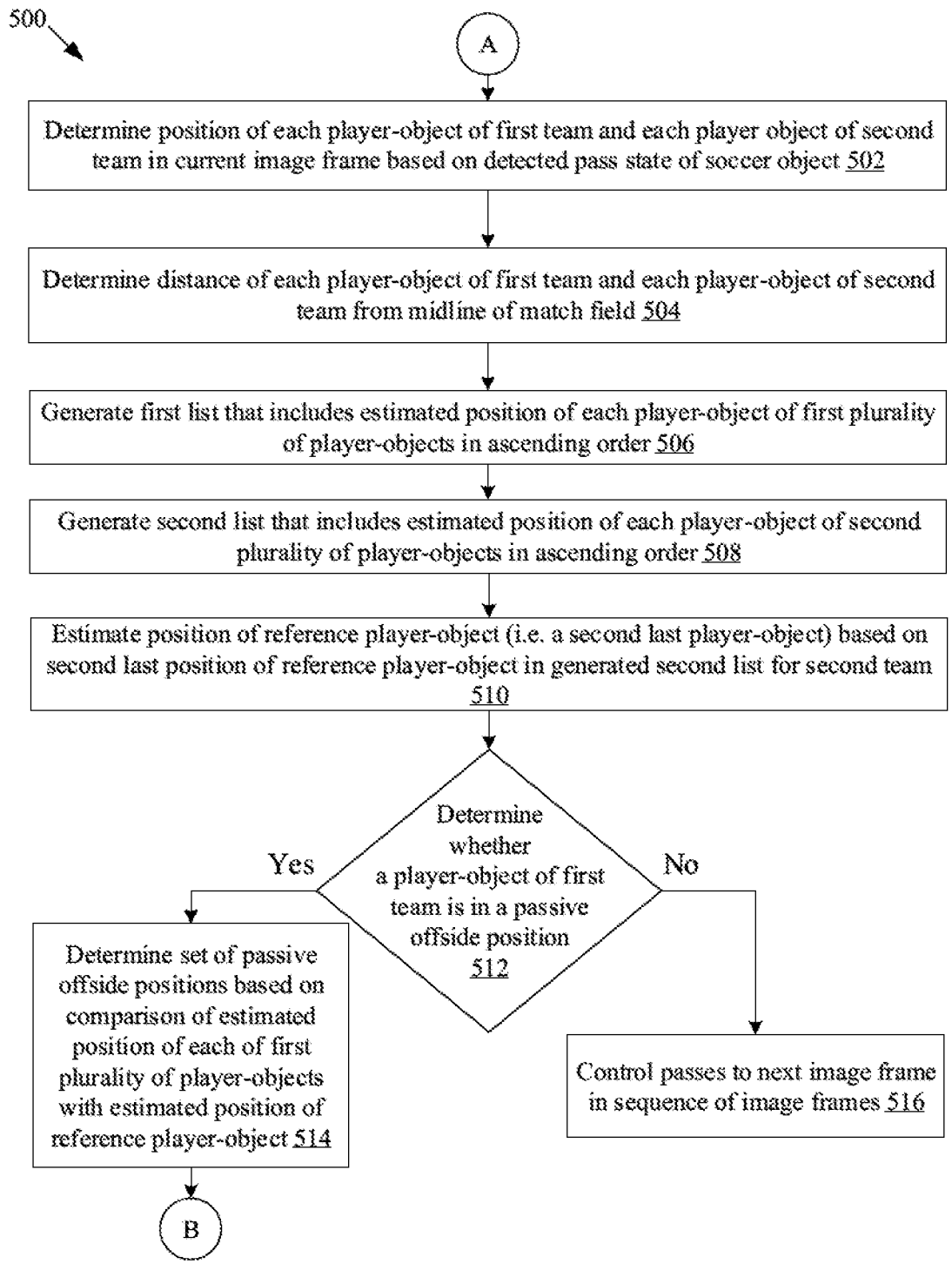
FIG. 5 is a flowchart that illustrates exemplary operations for detection of a set of passive offside positions based on a pass state of a soccer-object, in accordance with an embodiment of the disclosure.

FIG. 5 is a flowchart that illustrates exemplary operations for detection of a set of passive offside positions based on a pass state of a soccer-object, in accordance with an embodiment of the disclosure. FIG. 5 is explained in conjunction with elements from FIGS. 1, 2, 3A, 3B, and 4. With reference to FIG. 5, there is shown a flowchart 500 of the electronic device 102.

At 502, positions of each player-object of the first plurality of player-objects of the first team 120 and each player-object of the second plurality of player-objects of the second team 122 may be determined based on the detected pass state of the soccer-object 124. The offside detector 206 may be configured to determine the positions of each player-object of the first plurality of player-objects of the first team 120 and the second plurality of player-objects of the second team 122, based on the detection of the pass state.

As an example, the first team 120 may be represented by a label 'A' and the second team 122 may be represented by a label 'B'. The positions of the first plurality of player-objects of the first team 120 may be represented as A[1]($x_1$, $y_1$), A[2]($x_2,y_2$), . . . , A[n]($x_n,y_n$) and the positions of the second plurality of player-objects of the second team 122 may be represented as B[1]($x_1,y_1$), B[2]($x_2,y_2$), . . . , B[n]($x_n,y_n$). Here, n is an index of a player-object in each of the first team 120 and the second team 122. For example, each team in a soccer match may include 11 player-objects, thus n may vary from "0 to 11".

At 504, a distance of each player-object of the first team 120 and each player-object of the second team 122 may be determined from the midline of the match field 114. The offside detector 206 may be configured to determine the distance of each player-object of the first plurality of player-objects of the first team 120 and each player-object of the second plurality of player-objects of the second team 122 from the midline of the match field 114.

The offside detector 206 may be configured to determine the distance only along the X-axis with the midline as a reference axis for each of the first half 116 and the second half 118 of the match field 114. The x coordinate of the midline may be at X=0 (as shown in FIG. 1). The positions in the first half 116 may be negative, such as X–0 to X=−100, and the positions in the second half 118 may be positive, such as X=0 to X=100. The offside detector 206 may be configured to calculate an absolute value of distance between different player-objects of the first team 120 and the second team 122 and the midline (as shown in FIG. 1).

At 506, a first list that includes the estimated position of each player-object of the first plurality of player-objects in an ascending order may be generated. In accordance with an embodiment, the offside detector 206 may be configured to generate the first list that includes the estimated position of each player-object of the first plurality of player-objects in an ascending order.

At 508, a second list that includes the estimated position of each player-object of the second plurality of player-objects in an ascending order may be generated. In accordance with an embodiment, the offside detector 206 may be configured to generate the second list that includes the estimated position of each player-object of the second plurality of player-objects in the ascending order.

At 510, a position of the reference player-object 310 (i.e. a second last player-object) may be estimated based on a second last position of the reference player-object 310 in the generated second list for the second team 122. The offside detector 206 may be configured to estimate the position of the reference player-object 310 (i.e. a second last player-object) based on the second last position of the reference player-object in the generated second list for the second team 122.

In accordance with an embodiment, the offside detector 206 may be configured to identify the last player-object B[n]($x_n$,$y_n$) of the second team 122 (such as a defending team). The last player-object B[n]($x_n$,$y_n$) may be the goal keeper-object 312 of the second team 122. Except the last player-object B[n]($x_n$,$y_n$), the second last player-object B[n−1]($x_{n-1}$,$y_{n-1}$) may be farthest from the midline of the match field 114.

At 512, it may be determined whether a player-object of the first team 120 is in a passive offside position. The offside detector 206 may be configured to determine whether the player-object of the first team 120 is in the passive offside position based on comparison of the estimated position of each of the first plurality of player-objects with the estimated position of the reference player-object 310. In case the player-object of the first team 120 is in the passive offside position, control passes to 514. Otherwise, control passes to 516.

At 514, a set of passive offside positions may be determined based on the comparison of the estimated position of each of the first plurality of player-objects with the estimated position of the reference player-object 310. The offside detector 206 may be configured to determine the set of passive offside positions based on the comparison of the estimated position of each of the first plurality of player-objects with the estimated position of the reference player-object 310. As an example, the set of player-objects in passive offside positions may include the second player-object 308 of the first team 120.

At 516, control passes to a next image frame in the sequence of image frames. The offside detector 206 may be configured repeat the process of the flowchart 500 for the next image frame (i.e. a subsequent image frame) after the current image frame.

Figure 6:
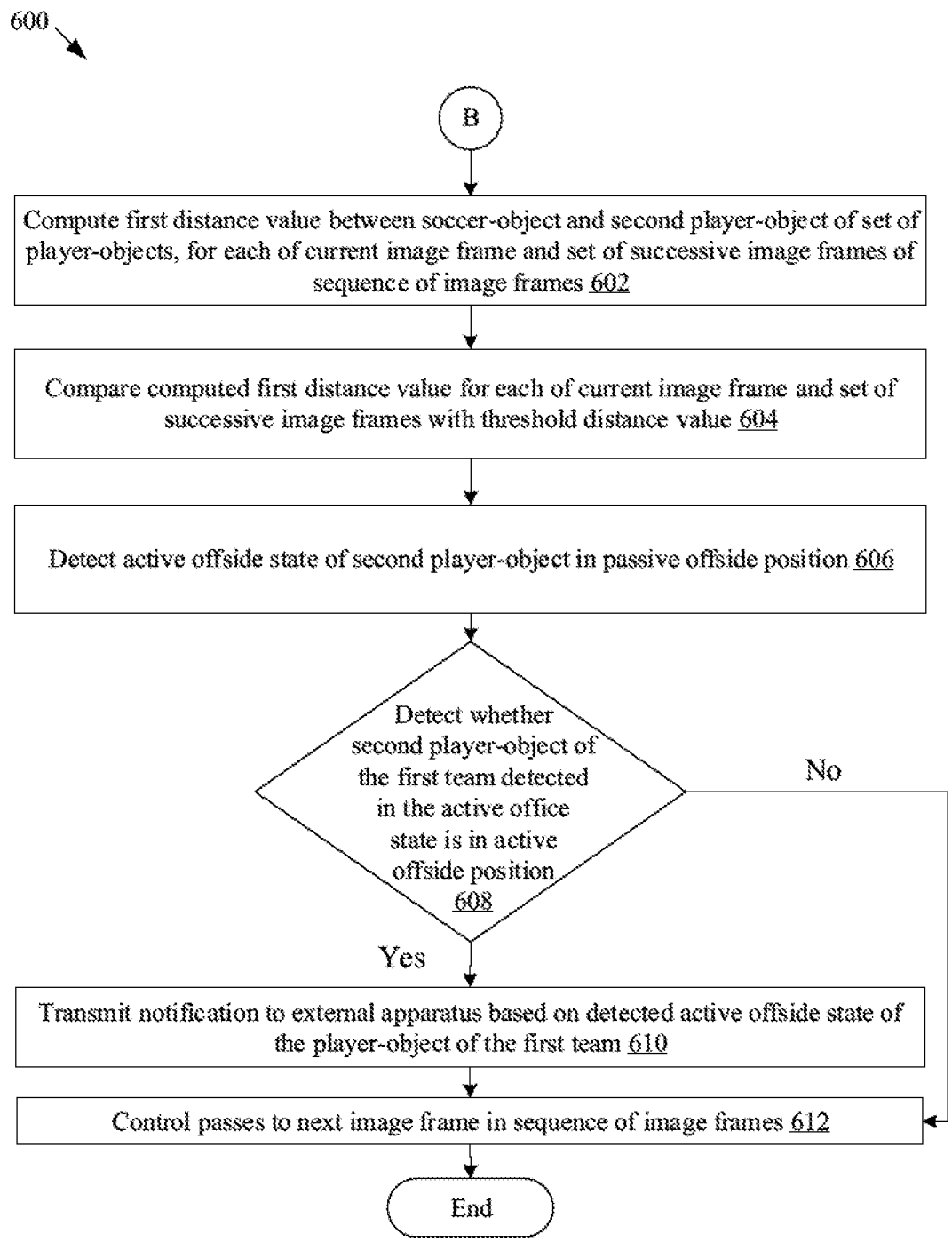
FIG. 6 is a flowchart that illustrates exemplary operations for detection of an active offside state based on a set of passive offside positions and a pass state of a soccer-object, in accordance with an embodiment of the disclosure.

FIG. 6 is a flowchart that illustrates exemplary operations for detection of an active offside state based on a set of passive offside positions and a pass state of a soccer-object, in accordance with an embodiment of the disclosure. FIG. 6 is explained in conjunction with elements from FIGS. 1, 2, 3A, 3B, 4, and 5. With reference to FIG. 6, there is shown a flowchart 600.

At 602, a first distance value may be computed between the soccer-object 124 and the second player-object 308 of the set of player-objects, for each of the current image frame (N) and a set of successive image frames of the sequence of image frames (e.g., N+90 frames). The offside detector 206 may be configured to compute the first distance value between the soccer-object 124 and the second player-object 308 of the set of player-objects, for each of the current image frame (N) and the set of successive image frames of the sequence of image frames.

At 604, the computed first distance value for each of the current image frame and the set of successive image frames may be compared with a threshold distance value (e.g., "5 pixels"). The offside detector 206 may be configured to compare the computed first distance value for each of the current image frame and the set of successive image frames with the threshold distance value (e.g., "5 pixels"). More specifically, the offside detector 206 may be configured to determine whether the computed first distance value between the set of player-objects in passive offside positions and the soccer-object 124 is less than the threshold distance value.

As an example, for each frame from N till No=N+"90", if x-component of the position parameter ($X_N$) of the soccer-object 124 is less than "0" (i.e. in the first half 116) and for an estimated position (Ao(x)n, Ao(y)n) of the second player-object 308, the active offside state may detected when (Ao(x)n−$X_N$) is less than "5 pixels" or (Ao(y)n−$Y_N$) is less than "5 pixels".

As another example, for each frame from N till No=N+90, if x-component of the position parameter ($X_N$) of the soccer-object 124 is greater than "0" (i.e. in the second half 118) and for an estimated position (Ao(x)n, Ao(y)n) of the second player-object 308, the active offside state may detected when (Ao(x)n−$X_N$) is less than "5 pixels" or (Ao(y)n−$Y_N$) is less than "5 pixels".

At 606, an active offside state of the second player-object 308 may be detected at the passive offside position. The offside detector 206 may be configured to detect the active offside state of the second player-object 308 at the passive offside position.

At 608, it may be determined whether the second player-object 308 of the first team 120 detected in the active office state is in an active offside position. The offside detector 206 may be configured to determine whether the second player-object 308 of the first team 120 in the active office state is in the active offside position. The active offside position may be a position of the second player-object 308 in the active offside state within the set of successive image frames (with respect to the current image frame). In case, the second player-object 308 of the first team 120 in the active office state is in the active offside position, control passes to 610. Otherwise, control passes to 612.

At 610, notification may be transmitted to the external apparatus 112 based on the detected active offside state of the player-object of the first team 120. The offside detector 206 may be configured to transmit the notification to the external apparatus 112. The notification may be transmitted in real time or near real time to the wearable device. The external apparatus 112 may be a wearable device, such as a smart watch or a smart glass that may be worn by the referee 128 during the gameplay on the match field 114. The notification may include an offside indicator that may correspond to the active offside state of the player-object.

At 612, control passes to a next image frame in the sequence of image frames. The offside detector 206 may be configured to repeat the process of the flowchart 600 for the next image frame (i.e. a subsequent image frame) after the current image frame. Control passes to end.

Figure 7:
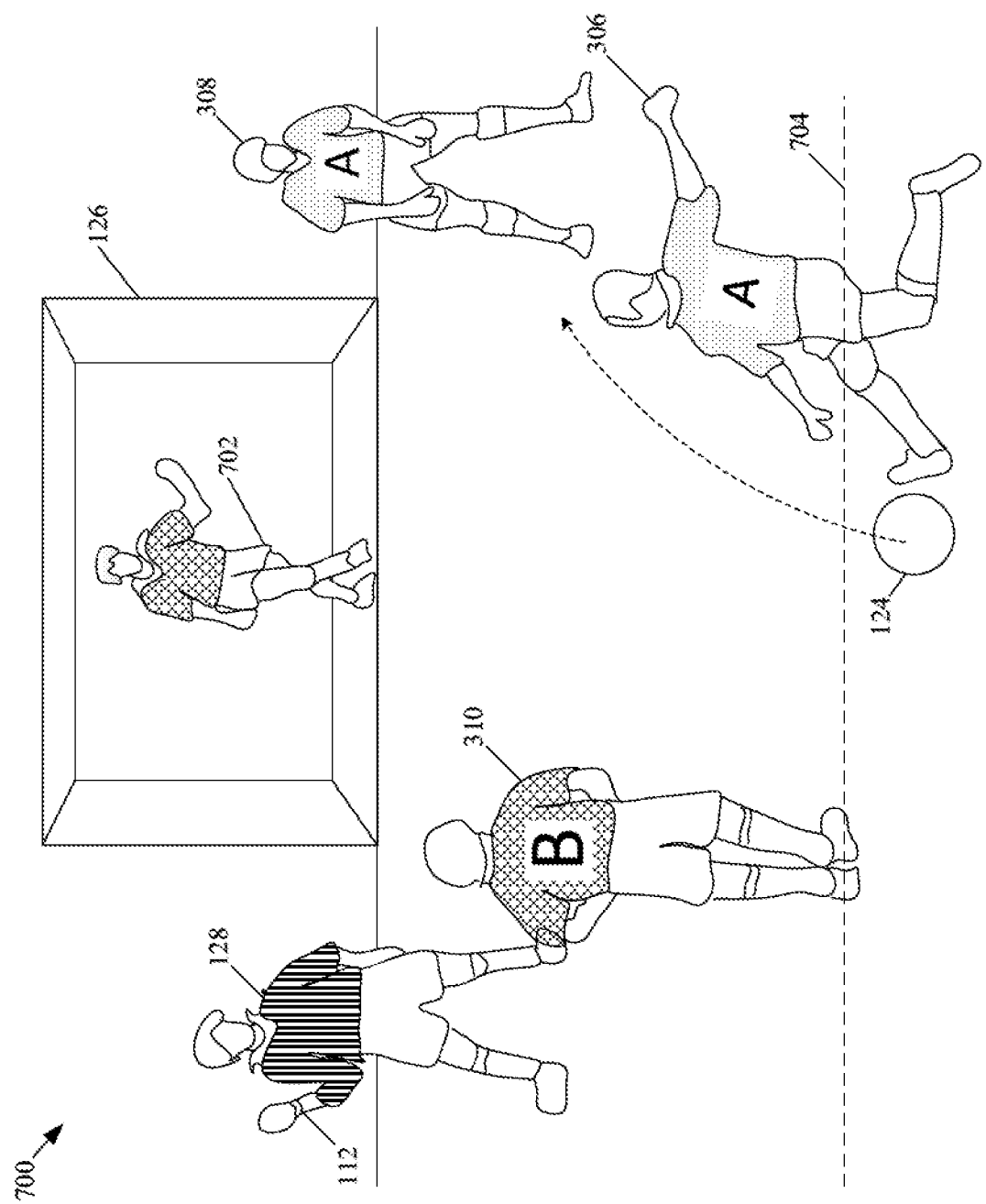
FIG. 7 illustrates an exemplary output representation of an offside in gameplay by the electronic device of FIG. 2, in accordance with an embodiment of the disclosure.

FIG. 7 illustrates an exemplary output representation of an offside in gameplay by the electronic device of FIG. 2, in accordance with an embodiment of the disclosure. FIG. 7 is explained in conjunction with elements from FIGS. 1, 2, 3A, 3B, 4, 5, and 6. With reference to FIG. 7, there is shown an exemplary scenario 700 of representation of the offside offense in a gameplay during a soccer match.

With reference to FIG. 7, there is shown the second half 118 of the match field 114. There is further shown the soccer-object 124, the goalpost 126 of the second team 122, and the external apparatus 112 worn by the referee 128 in the gameplay. There is further shown different player-objects from the first team 120 and the second team 122, such as the first player-object 306 and the second player-object 308 of the first team 120, and a reference player-object 310 and a player-object 702 of the second team 122. There is further shown an offside indicator 704 at the position of the reference player-object 310.

In accordance with an embodiment, the first team 120 (such as an attacking team) may wish to score a goal in the goalpost 126 of the second team 122 (such as a defending team). The second half 118 of the match field 114 may correspond to the second team 122. At a particular time, the first player-object 306 may kick the soccer-object 124 towards the second player-object 308. The second player-object 308 may be in a passive offside position with respect to a position of the reference player-object 310 who may be the second last player-object of the second team 122. The player-object 702 may correspond to the goal keeper-object 312 of the second team 122.

In accordance with an embodiment, the second player-object 308 may be considered to be in an active offside state as the soccer-object 124 almost comes in the possession of the second player-object 308. A notification on the external apparatus 112 (such as a smart watch) may be received based on the detection of the active offside state by the electronic device 102 (as explained in FIG. 6). The referee 128 may formally make an announcement for an offside offense based on the receipt of the notification.

In accordance with an embodiment, the offside detector 206 of the electronic device 102 may be configured to overlay an offside indicator 410, such as a line on the current image frame to generate an offside status image. The processor 204 may be configured to transmit the offside status image with the notification to the external apparatus 112. For example, the notification may include, but is not limited to, a vibration, a sound, or an image. The offside status image may further include offside information such as, information of the reference player-object 310 (i.e. a second-last player-object), the first player-object 306, and the second player-object 308.

In accordance with an embodiment, the processor 204 may be configured to receive a user input from the referee 128 wearing the external apparatus 112, in response to the notification. The user input may correspond to a request to see the offside information. The processor 204 may be further configured to transmit the offside status image to the external apparatus 112 based on the user input. For example, the referee 128 may receive the notification on the external apparatus 112 after a pass has been made. The referee 128 may pause the gameplay between the first team 120 and the second team 122. A player-object of the first team 120 may appeal the decision. A user input from the referee 128 may be transmitted to the electronic device 102. The electronic device 102 may transmit the offside status image with the offside indicator 410 to the external apparatus 112 and provide a proof for the offside offense. In accordance with an embodiment, the processor 204 may be further configured to display the notification and/or the offside status image on the display device 212A of the electronic device 102.

Figure 8:
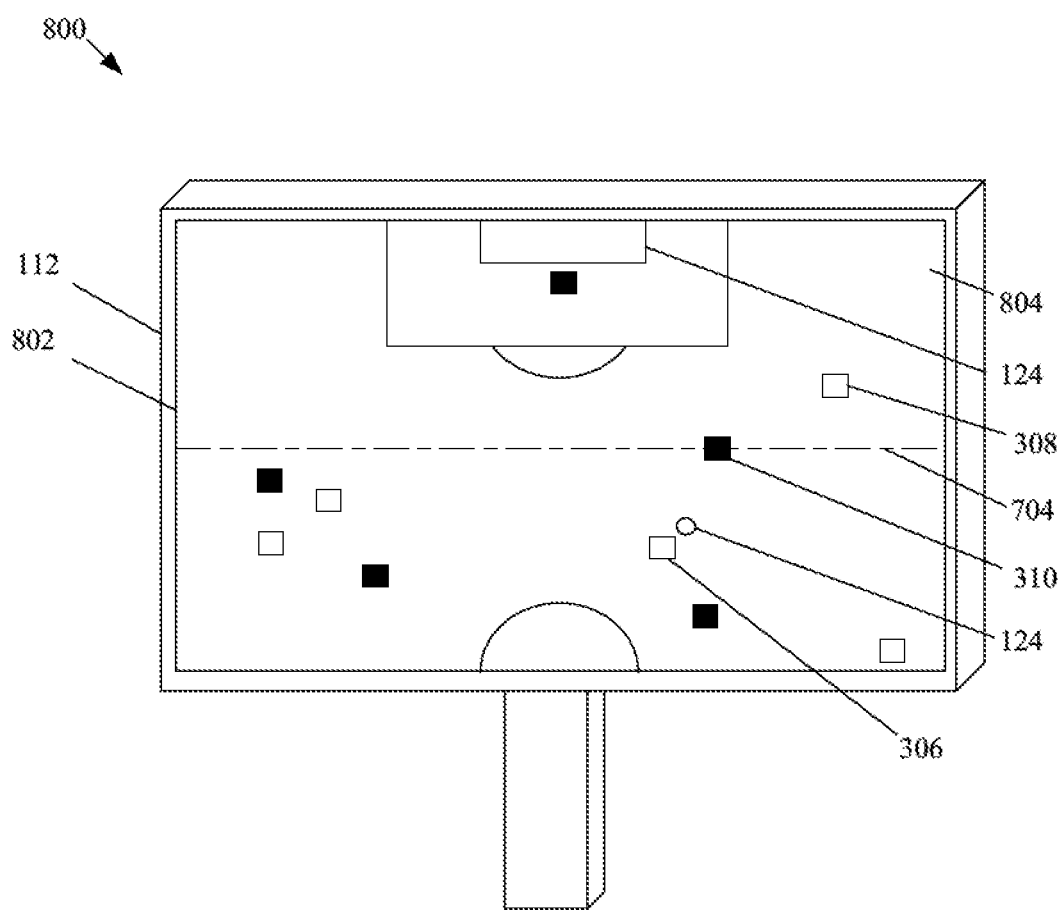
FIG. 8 illustrates an exemplary scenario for display of offside information in response to detection of an active offside state in a match field, in accordance with an embodiment of the disclosure.

FIG. 8 illustrates an exemplary scenario for display of offside information in response to detection of an active offside state in a match field, in accordance with an embodiment of the disclosure. FIG. 8 is explained in conjunction with elements from FIGS. 1, 2, 3A, 3B, 4, 5, 6, and 7.

With reference to FIG. 8, there is shown an exemplary scenario 800. The exemplary scenario 800 includes the external apparatus 112 that may correspond to an in-stadium display screen. In the external apparatus 112, there is shown a display portion 802 that may display an offside status image 804. The display portion 802 may be controlled by the electronic device 102 to display details of the offside information to the audience of a match, before or after the referee 128 makes a call to accept the detection of the active offside state based on the notification.

Figure 9A:
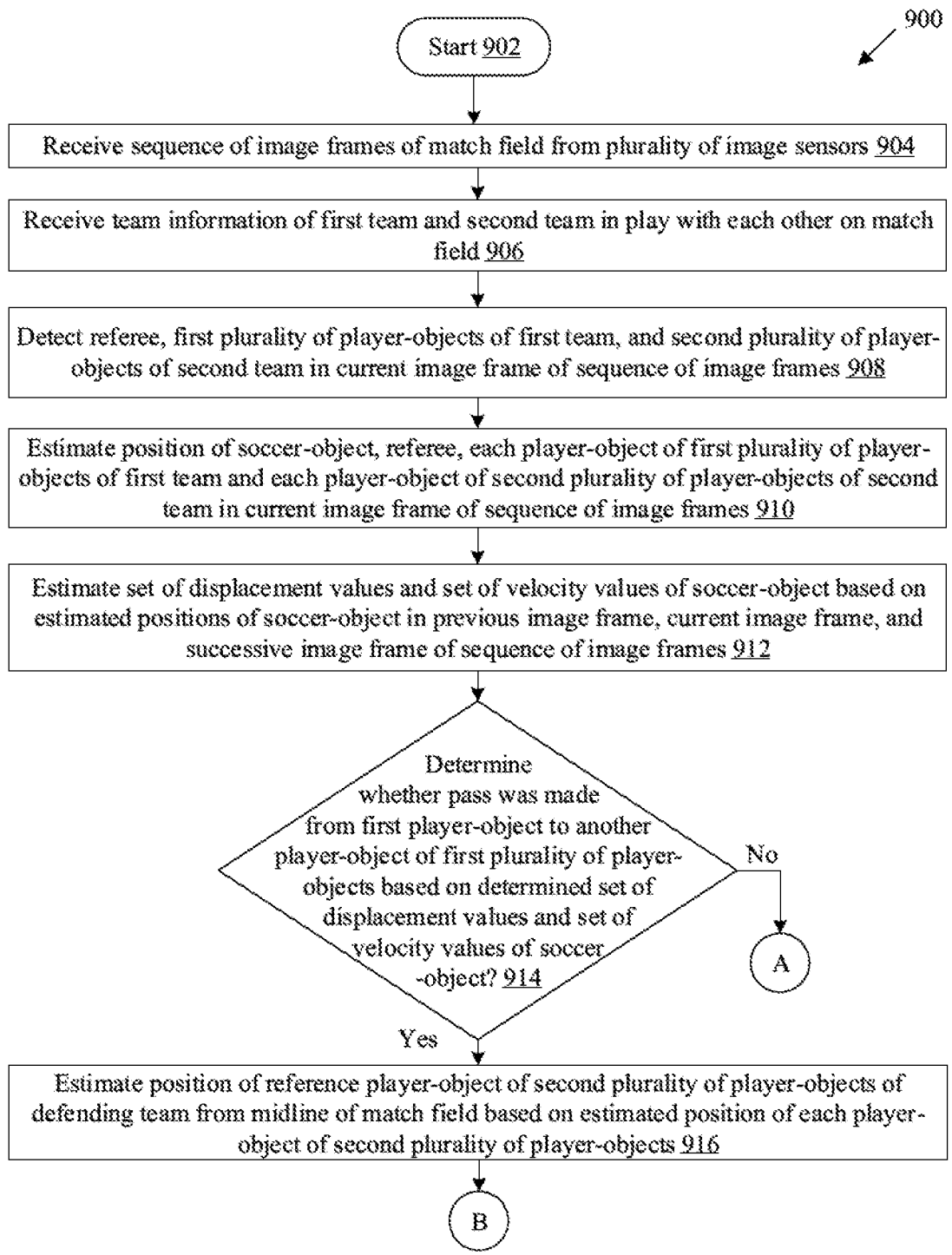
FIGS. 9A and 9B, collectively, depict a flowchart that illustrates exemplary operations for image-based detection of offside in gameplay, in accordance with an embodiment of the disclosure.
Figure 9B:
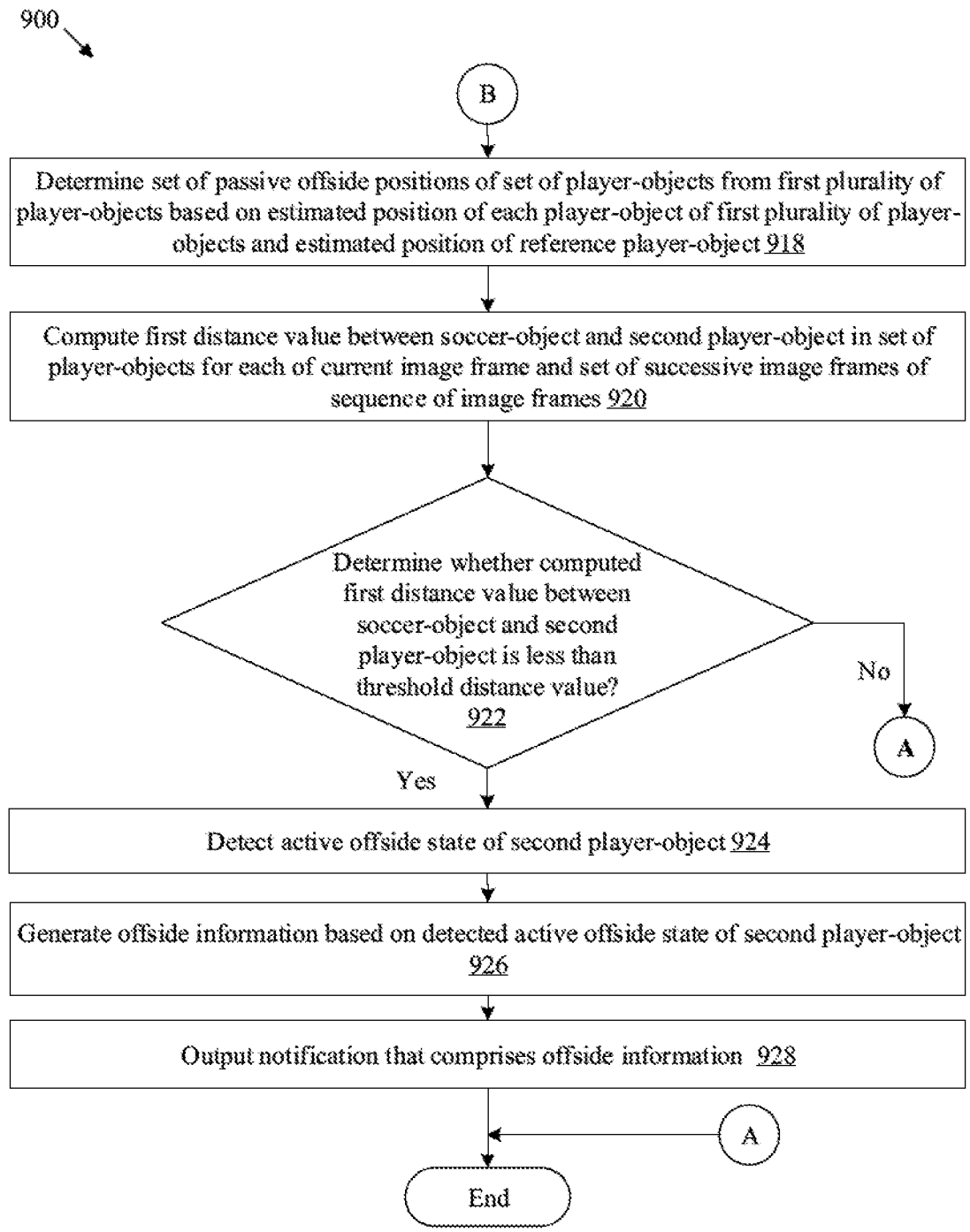

FIGS. 9A and 9B, collectively, depict a flowchart that illustrates exemplary operations for image-based detection of offside in gameplay, in accordance with an embodiment of the disclosure. With reference to FIGS. 9A and 9B, there is shown a flowchart 900. The flowchart 900 is described in conjunction with FIGS. 1, 2, 3A, 3B, 4, 5, 6, 7, and 8. The operations from 902 to 928 may be implemented in the electronic device 102. The operations of the flowchart 900 may start at 902 and proceed to 904.

At 904, a sequence of image frames of the match field 114 may be received from the plurality of image sensors 104. In accordance with an embodiment, the processor 204 may be configured to receive the sequence of image frames from the plurality of image sensors 104. The sequence of image frames may include a plurality of views of the match field 114 such as the top view. As an example, the plurality of image sensors 104 may be embedded within a drone or a cable-suspended camera system.

At 906, team information of the first team 120 and the second team 122 in play with each other on the match field 114 may be received. In accordance with an embodiment, the processor 204 may be configured to receive the team information from the server 108. The team information may include, but is not limited to, history of gameplays, team identifiers, such as team clothing patterns for home gameplays and away gameplays, and/or player information of the first team 120 and the second team 122.

At 908, the referee 128, the first plurality of player-objects of the first team 120, and the second plurality of player-objects of the second team 122 may be detected in the current image frame of the sequence of image frames. In accordance with an embodiment, the processor 204 may be configured to detect the referee 128, the first plurality of player-objects of the first team 120, and the second plurality of player-objects of the second team 122, based on a DNN model, such as a trained faster-RCNN model.

At 910, positions of the soccer-object 124, the referee 128, each player-object of first plurality of player-objects of the first team 120, and each player-object of second plurality of player-objects of second team 122 may be estimated in the current image frame of the sequence of image frames. In accordance with an embodiment, the offside detector 206 may be configured to estimate the positions of the soccer-object 124, the referee 128, each player-object of first plurality of player-objects of the first team 120, and each player-object of second plurality of player-objects of the second team 122 in the current image frame.

At 912, a set of displacement values and a set of velocity values of the soccer-object 124 may be estimated based on the estimated positions of the soccer-object 124 in a previous image frame, the current image frame, and a successive image frame of the sequence of image frames. In accordance with an embodiment, the offside detector 206 may be configured to determine the set of displacement values and the set of velocity values of the soccer-object 124 over consecutive image frames based on the estimated positions of the soccer-object 124 in the consecutive image frames.

At 914, determine whether a pass was made from a first player-object to another player-object of the first plurality of player-objects based on the determined set of displacement values and set of velocity values of the soccer-object 124. In accordance with an embodiment, the offside detector 206 may be configured to determine whether a pass was made from the first player-object to another player-object of the first team 120, as described in detail, for example in FIG. 4. In case the pass is not made, the control passes to end. Otherwise, control passes to 916.

At 916, a position of a reference player-object of the second plurality of player-objects of the second team 122 may be estimated from a midline of the match field 114 based on the estimated position of each player-object of the second plurality of player-objects. In accordance with an embodiment, the offside detector 206 may be configured to estimate the position of the reference player-object (i.e. a second last player-object) of the second plurality of player-objects of the second team 122.

At 918, a set of passive offside positions of a set of player-objects from the first plurality of player-objects may be determined based on the estimated position of each player-object of the first plurality of player-objects and the estimated position of the reference player-object. The set of passive offside positions may be in the territory of the second team 122, as described in detail, for example, in FIG. 5.

At 920, a first distance value between the soccer-object 124 and the second player-object in the set of player-objects may be computed for each of the current image frame and a set of successive image frames of the sequence of image frames. In accordance with an embodiment, the offside detector 206 may be configured to compute the first distance value between the soccer-object 124 and the second player-object in the set of player-objects for each of the current image frame and a set of successive image frames of the sequence of image frames.

At 922, determine whether the computed first distance value between the soccer-object 124 and the second player-object is less than a threshold distance value. In accordance with an embodiment, the offside detector 206 may be configured to determine whether the computed distance value between the soccer-object 124 and the second player-object is less than the threshold distance value. In case the computed first distance value is less than the threshold distance value, control passes to 924. Otherwise, control passes to end.

At 924, an active offside state of the second player-object may be detected. In accordance with an embodiment, the offside detector 206 may be configured to detect the active offside state of the second player-object, as described in detail, for example, in FIG. 6.

At 926, offside information may be generated based on the detected active offside state of the second player-object. The offside information may include an offside identifier indicative of the active offside state. In accordance with an embodiment, the offside detector 206 may be configured to generate the offside information based on the detected active offside state. The offside information may include the offside indicator, such as a line at a position of the second last player-object of the second team 122.

At 928, a notification that comprises the offside information may be outputted. In accordance with an embodiment, the processor 204 may be configured to output the notification that includes the offside information on the display device 212A or the external apparatus 112. For example, the notification may include, but is not limited to, a vibration, a sound, or an image. Control passes to end.

Various embodiments of the disclosure provide an electronic device (e.g. electronic device 102). The electronic device 102 may include a memory (e.g. memory 208). The memory 208 may be configured to store a sequence of image frames of a match field (e.g. match field 114). The electronic device may further include a circuitry (e.g. circuitry 202). The circuitry may be configured to estimate, from a current image frame of the sequence of image frames, a position of each player-object of a first plurality of player-objects of a first team (e.g. first team 120) and each player-object of a second plurality of player-objects of a second team (e.g. second team 122). The second team may be in play with the first team. The circuitry may be further configured to estimate a set of displacement values and a set of velocity values of a soccer-object (e.g. soccer-object 124) based on a position parameter of the soccer-object in a previous image frame, the current image frame, and a successive image frame of the sequence of image frames. The circuitry may be further configured to detect a pass state of the soccer-object based on at least one of the estimated set of displacement values and the set of velocity values. The detected pass state corresponds to a release of the soccer-object from a first player-object of the first plurality of player-objects towards at least one player-object of the first plurality of player-objects. The circuitry may be further configured to determine, from the current image frame, a set of passive offside positions of a set of player-objects from the first plurality of player-objects, based on the estimated position of each player-object of the first plurality of player-objects. The circuitry may be further configured to compute a first distance value between the soccer-object and a second player-object (e.g. a second player-object 308) in the set of player-objects, for each of the current image frame and a set of successive image frames of the sequence of image frames. The circuitry may be further configured to compare the computed first distance value for each of the current image frame and the set of successive image frames with a threshold distance value. The circuitry may be further configured to detect an active offside state of the second player-object 308, based on the comparison of the first distance value with the threshold distance value.

In accordance with an embodiment, the electronic device may further include a plurality of image sensors (e.g. plurality of image sensors 104). The plurality of image sensors may be configured to capture the sequence of image frames from a field-of-view (FOV) of the plurality of image sensors. The FOV may correspond to a top view of at least a first half (e.g. first half 116), a second half (e.g. second half 118), or a full size of the match field. At least one of the first half and the second half of the match field correspond to a territory of the second team.

In accordance with an embodiment, at least one image sensor of the plurality of image sensors may be present in at least a drone or a cable-suspended camera system for the match field.

In accordance with an embodiment, the circuitry may be further configured to control motion of the plurality of image sensors to capture a view of the match field from different image sensor positions or different elevations with respect to the match field.

In accordance with an embodiment, the circuitry may be further configured to detect the first plurality of player-objects and the second plurality of player-objects based on at least one of facial characteristics, a color, or a pattern associated with each player-object of the first plurality of player-objects and the second plurality of player-objects.

In accordance with an embodiment, the circuitry may be further configured to estimate a first identifier for the first team, a second identifier for the second team, and a third identifier for a referee (e.g. referee 128) in the match field.

In accordance with an embodiment, the first identifier, the second identifier, and the third identifier may be estimated based on a deep neural network (DNN) model. The DNN model may be based on a faster-regional convolutional neural network (RCNN). The DNN model may be pre-trained based on a match dataset that comprises a plurality of image frames of historical gameplays of a plurality of soccer teams.

In accordance with an embodiment, the circuitry may be further configured to compute a ratio of a first net displacement value and a second net displacement value based on the estimated set of displacement values. The first net displacement value may correspond to a displacement of the soccer-object from the previous image frame to the current image frame. Similarly, the second net displacement value may correspond to a displacement of the soccer-object from the current image frame to the successive image frame. The circuitry may be further configured to compare the computed ratio with a threshold difference value and detect the pass state further based on the comparison of the absolute ratio with the threshold difference value. In accordance with an embodiment, the current image frame and the previous image frame may be consecutive image frames of the sequence of image frames.

In accordance with an embodiment, the circuitry may be further configured to determine a first direction value and a second direction value based on a first displacement value and a second displacement value of the set of displacement values. The first displacement value and the second displacement value correspond to the current image frame and the previous image frame. The circuitry may be further configured to compare a ratio of the first direction value and the second direction value to a threshold direction value and detect the pass state further based on the comparison of the ratio with the threshold direction value.

In accordance with an embodiment, the first player-object of the first plurality of player-objects may be in possession of the soccer-object in a territory of the second team prior to the detection of the pass state. The current image frame and the previous image frame may correspond to the territory of the second team in the match field.

In accordance with an embodiment, the circuitry may be further configured to generate a first list that comprises the estimated position of each player-object of the first plurality of player-objects in an ascending order and generate a second list that comprises the estimated position of each player-object of the second plurality of player-objects in the ascending order.

In accordance with an embodiment, the circuitry may be further configured to compare the estimated position of each of the first plurality of player-objects with the estimated position of a reference player-object of the second team. The reference player-object may correspond to a second last position in the generated second list. The circuitry may be further configured to detect the set of passive offside positions further based on the comparison of the estimated position of each of the first plurality of player-objects with the estimated position of the reference player-object.

In accordance with an embodiment, a distance of each of the set of player-objects from a goalpost (e.g. goalpost 126) of the second team may be less than the estimated position of the third player-object 706 from the goalpost.

In accordance with an embodiment, the active offside state may correspond to an offside offense committed by the at least one player-object of the first team within a duration of a gameplay.

In accordance with an embodiment, the circuitry may be further configured to generate an offside status image based on the detected active offside state. The offside status image comprises an offside identifier and the offside identifier may comprise a line that corresponds to the estimated position of the reference player-object of the second team.

In accordance with an embodiment, the circuitry may be further configured to control display of offside information on a display screen (e.g. display device 212A). The offside information may correspond to the detected active offside state and the offside status image.

In accordance with an embodiment, the circuitry may be further configured to transmit a notification on a wearable device based on the detected active offside state. The wearable device may be worn by a referee in the match field and the notification may include the offside information that may correspond to the active offside state and the offside status image. The notification may be transmitted in real time or near real time to the wearable device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
a memory configured to store a sequence of image frames of a match field; and
a circuitry configured to:
estimate, from a current image frame of the sequence of image frames, a position of each player-object of a first plurality of player-objects of a first team and each player-object of a second plurality of player-objects of a second team, wherein the second team is in play with the first team;
estimate a set of displacement values of a soccer-object and a set of velocity values of the soccer-object based on a position parameter of the soccer-object in each of a previous image frame, the current image frame, and a successive image frame of the sequence of image frames;
determine each of a first direction value of the soccer-object in the previous image frame and a second direction value of the soccer-object in the current image frame based on a first displacement value and a second displacement value of the set of displacement values, wherein the first displacement value and the second displacement value correspond to the previous image frame and the current image frame;
compare a ratio of the first direction value and the second direction value with a threshold direction value;
detect a pass state of the soccer-object based on the set of velocity values of the soccer-object, and the comparison of the ratio with the threshold direction value, wherein the detected pass state corresponds to release of the soccer-object from a first player-object of the first plurality of player-objects towards at least one player-object of the first plurality of player-objects;
determine, from the current image frame, a set of passive offside positions of a set of player-objects from the first plurality of player-objects, based on the estimated position of each player-object of the first plurality of player-objects and the detected pass state of the soccer-object;
compute a first distance value between the soccer-object and a second player-object in the set of player-objects, for each of the current image frame and a set of successive image frames of the sequence of image frames;
compare the computed first distance value for each of the current image frame and the set of successive image frames with a threshold distance value; and
detect an active offside state of the second player-object, based on the comparison of the first distance value with the threshold distance value.

2. The electronic device according to claim 1, further comprising a plurality of image sensors, wherein
the plurality of image sensors is configured to capture the sequence of image frames from a field-of-view (FOV) of the plurality of image sensors,
the FOV corresponds to a top view of at least one of a first half, a second half, or a full size of the match field, and
at least one of the first half or the second half of the match field corresponds to a territory of the second team.

3. The electronic device according to claim 2, wherein at least one image sensor of the plurality of image sensors is present in at least one of a drone or a cable-suspended camera system for the match field.

4. The electronic device according to claim 2, wherein the circuitry is further configured to control motion of the plurality of image sensors to capture a view of the match field from at least one of different image sensor positions or different elevations with respect to the match field.

5. The electronic device according to claim 1, wherein the circuitry is further configured to detect the first plurality of player-objects and the second plurality of player-objects based on at least one of facial characteristics, a color, or a pattern associated with each player-object of the first plurality of player-objects and the second plurality of player-objects.

6. The electronic device according to claim 1, wherein the circuitry is further configured to estimate a first identifier for the first team, a second identifier for the second team, and a third identifier for a referee in the match field.

7. The electronic device according to claim 6, wherein the circuitry is further configured to estimate each of the first identifier, the second identifier, and the third identifier based on a deep neural network (DNN) model.

8. The electronic device according to claim 7, wherein the DNN model is based on a faster-regional convolutional neural network (RCNN).

9. The electronic device according to claim 7, wherein
the DNN model is based on a match dataset, and
the match dataset comprises a plurality of image frames of historical gameplays of a plurality of soccer teams.

10. The electronic device according to claim 1, wherein the current image frame and the previous image frame are consecutive image frames of the sequence of image frames.

11. The electronic device according to claim 1, wherein the circuitry is further configured to:
compute a ratio of a first net displacement value of the soccer-object and a second net displacement value of the soccer-object based on the estimated set of displacement values, wherein
the first net displacement value corresponds to a displacement of the soccer-object from the previous image frame to the current image frame, and
the second net displacement value corresponds to a displacement of the soccer-object from the current image frame to the successive image frame;
compare the computed ratio with a threshold difference value; and
detect the pass state further based on the comparison of the ratio with the threshold difference value.

12. The electronic device according to claim 1, wherein
the first player-object of the first plurality of player-objects is in possession of the soccer-object in a territory of the second team prior to the detection of the pass state, and
the current image frame and the previous image frame correspond to the territory of the second team in the match field.

13. The electronic device according to claim 1, wherein the circuitry is further configured to:
generate a first list that comprises the estimated position of each player-object of the first plurality of player-objects in an ascending order; and
generate a second list that comprises the estimated position of each player-object of the second plurality of player-objects in the ascending order.

14. The electronic device according to claim 13, wherein the circuitry is further configured to:
compare the estimated position of each of the first plurality of player-objects with the estimated position of a reference player-object of the second team, wherein the reference player-object corresponds to a second last position in the generated second list; and determine the set of passive offside positions further based on the comparison of the estimated position of each of the first plurality of player-objects with the estimated position of the reference player-object.

15. The electronic device according to claim 1, wherein a distance of each of the set of player-objects from a goalpost of the second team is less than the estimated position of a reference player-object from the goalpost.

16. The electronic device according to claim 1, wherein the active offside state corresponds to an offside offense by the at least one player-object of the first team within a duration of a gameplay.

17. The electronic device according to claim 16, wherein the circuitry is further configured to generate an offside status image based on the detected active offside state, the offside status image comprises an offside identifier, and the offside identifier comprises a line indicator that corresponds to the estimated position of a reference player-object of the second team.

18. The electronic device according to claim 17, wherein the circuitry is further configured to control display of offside information on a display screen, and the offside information corresponds to the detected active offside state and the offside status image.

19. The electronic device according to claim 18, wherein the circuitry is further configured to transmit a notification to a wearable device based on the detected active offside state, wherein the wearable device is wearable by a referee in the match field, and the notification comprises the offside information that corresponds to the active offside state and the offside status image.

20. The electronic device according to claim 19, wherein the circuitry is further configured to transmit the notification in one of real time or near real time to the wearable device.

21. A method, comprising:
in an electronic device:
estimating, from a current image frame of a sequence of image frames, a position of each player-object of a first plurality of player-objects of a first team and each player-object of a second plurality of player-objects of a second team, wherein the second team is in play with the first team;

estimating a set of displacement values of a soccer-object and a set of velocity values of the soccer-object based on a position parameter of the soccer-object in each of a previous image frame, the current image frame, and a successive image frame of the sequence of image frames;

determining each of a first direction value of the soccer-object in the previous image frame and a second direction value of the soccer-object in the current image frame based on a first displacement value and a second displacement value of the set of displacement values, wherein the first displacement value and the second displacement value correspond to the previous image frame and the current image frame;

comparing a ratio of the first direction value and the second direction value with a threshold direction value;

detecting a pass state of the soccer-object based on the set of velocity values of the soccer-object, and the comparison of the ratio with the threshold direction value, wherein the detected pass state corresponds to release of the soccer-object from a first player-object of the first plurality of player-objects towards at least one player-object of the first plurality of player-objects;

determining, from the current image frame, a set of passive offside positions of a set of player-objects of the first plurality of player-objects, based on the estimated position of each player-object of the first plurality of player-objects and the detected pass state of the soccer-object;

computing a first distance value between the soccer-object and a second player-object in the set of player-objects, for each of the current image frame and a set of successive image frames of the sequence of image frames;

comparing the computed first distance value for each of the current image frame and the set of successive image frames with a threshold distance value; and detecting an active offside state of the second player-object, based on the comparison of the first distance value with the threshold distance value.

* * * * *